United States Patent
Chang et al.

(10) Patent No.: US 11,481,929 B2
(45) Date of Patent: Oct. 25, 2022

(54) SYSTEM AND METHOD FOR COMPRESSING AND DECOMPRESSING IMAGES USING BLOCK-BASED COMPRESSION FORMAT

(71) Applicant: Meta Platforms Technologies, LLC, Menlo Park, CA (US)

(72) Inventors: Cheng Chang, Redmond, WA (US); Richard Lawrence Greene, Kirkland, WA (US); Richard Webb, Sammamish, WA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 0 days.

(21) Appl. No.: 16/820,264

(22) Filed: Mar. 16, 2020

(65) Prior Publication Data
US 2021/0287404 A1 Sep. 16, 2021

(51) Int. Cl.
*G06T 9/00* (2006.01)

(52) U.S. Cl.
CPC ...................... *G06T 9/00* (2013.01)

(58) Field of Classification Search
CPC ...................................... G06T 9/00
USPC ........................................ 382/238
See application file for complete search history.

(56) References Cited

U.S. PATENT DOCUMENTS

| | | | | |
|---|---|---|---|---|
| 6,184,888 B1 * | 2/2001 | Yuasa | ...................... | G06T 15/10 345/419 |
| 7,751,633 B1 * | 7/2010 | Mukherjee | ............. | H04N 19/15 382/232 |
| 10,034,024 B2 * | 7/2018 | Kim | ...................... | H04N 19/122 |
| 2014/0198122 A1 * | 7/2014 | Grossman | ................. | G06T 9/00 345/582 |
| 2017/0201753 A1 * | 7/2017 | Thirumalai | .......... | H04N 19/147 |
| 2020/0296423 A1 * | 9/2020 | Chao | ...................... | H04N 19/42 |

OTHER PUBLICATIONS

International Search Report and Written Opinion on PCT Appln PCT/US2021/022446 dated May 27, 2021 (8 pages).

* cited by examiner

*Primary Examiner* — Wednel Cadeau
(74) *Attorney, Agent, or Firm* — Foley & Lardner LLP

(57) ABSTRACT

Disclosed herein includes a system, a method, and a device for compressing image data. The device includes one or more processors, coupled to memory, configured to identify a plurality of sub-blocks of a block of image data including a first sub-block and a second sub-block. The one or more processors are configured to identify a first data characteristic of data of the first sub-block and a second data characteristic of data of the second sub-block, determine a first compression technique based at least on the first data characteristic of the first sub-block, determine a second compression technique based at least on the second data characteristic of the second sub-block, and compress the first sub-block using the first compression technique and the second sub-block using the second compression technique.

18 Claims, 11 Drawing Sheets

| FIELD | NUMBER OF BITS | DESCRIPTION |
|---|---|---|
| PRECISION | 3 | Number of packed bits per sample in 8x8 sub-block<br><br>000 ⇒ 0 bits (all samples in 8x8 sub-block = OFFSET)<br>001 ⇒ 1 bit<br>010 ⇒ 2 bits<br>011 ⇒ 3 bits<br>100 ⇒ 4 bits<br>101 ⇒ 8 bits (uncompressed, but do not assume SCALE=255 or OFFSET=0)<br>110 ⇒ 6 bits<br>111 ⇒ Transparent (block has no data and is not displayed) |
| OFFSET | 8 | Maps to 0 value of input sample |
| SCALE | 8 | Dynamic range of the sub-block |

FIG. 4

| FIELD | NUMBER OF BITS |
|---|---|
| B0_PRECISION | 3 |
| B0_OPAQUE | 1 |
| B0_OFFSET | 8 |
| B0_SCALE | 8 |
| B1_PRECISION | 3 |
| B1_OPAQUE | 1 |
| B1_OFFSET | 8 |
| B1_SCALE | 8 |
| B2_PRECISION | 3 |
| B2_OPAQUE | 1 |
| B2_OFFSET | 8 |
| B2_SCALE | 8 |
| B3_PRECISION | 3 |
| B3_OPAQUE | 1 |
| B3_OFFSET | 8 |
| B3_SCALE | 8 |

FIG. 5

SYSTEM AND METHOD FOR COMPRESSING AND DECOMPRESSING IMAGES USING BLOCK-BASED COMPRESSION FORMAT

FIELD OF DISCLOSURE

The present disclosure is generally related to a system and method for compressing and decompressing image data, including but not limited to a system and method for compressing different sub-blocks of a block of image data by optimally selecting between different possible compression techniques based on data characteristics of the sub-blocks.

BACKGROUND

One challenge in image data compression relates to reducing storage requirements in performing image data compression. For example, a significant storage space may be required to store pixel surface data representing a texture space of image data. Here, the term "surface data" refers to data relating to a 3D display window texture (e.g., a re-projectable 3D display window texture). Another challenge in image data compression relates to reducing power consumption in transmitting image data from an image processing system to another system. For example, significant power may be required to transmit texel surface data from a host processor to a display module via a high-speed serial interface. In view of the needs for efficient storage utilization and power consumption, improvements in compression algorithm and data format for image data may be desired.

SUMMARY

Various embodiments disclosed herein are related to method for compressing image data. In some implementations, the method includes identifying, by a processor, a plurality of sub-blocks of a block of image data including a first sub-block and a second sub-block. The method may further include identifying, by the processor, a first data characteristic of data of the first sub-block and a second data characteristic of data of the second sub-block. The method may further include determining, by the processor, a first compression technique based at least on the first data characteristic of the first sub-block. The method may further include determining, by the processor, a second compression technique based at least on the second data characteristic of the second sub-block. The method may further include compressing, by the processor, the first sub-block using the first compression technique and the second sub-block using the second compression technique.

In some implementations, the second compression technique determined based on the second data characteristic that is different from the first data characteristic, may be different from the first compression technique.

In some implementations, the data characteristic of each of the first and second sub-blocks may be at least one of an image quality, a range of values, a compression rate, or a distortion efficiency. The method may further include determining a range of values within each of the first and second sub-blocks such that the range of values satisfy a target cost function of (1) a compression rate and (2) a distortion efficiency.

In some implementations, each of the first and second compression techniques may be one of lossless compression, lossy compression, prediction-based compression, or no compression.

In some implementations, the block of image data may correspond to one of a plurality of channels. Each channel may be one of a color channel or an alpha channel.

In some implementations, the method may further include generating a plurality of first compressed blocks by compressing a plurality of first blocks. Each block of the plurality of first blocks may correspond to one of the plurality of channels. The method may further include dividing the plurality of first compressed blocks into a plurality of first data slices. Each of the plurality of first data slices may include a plurality of portions, such that each portion includes compressed blocks corresponding to a respective one of the plurality of channels. In some implementations, the method may further include generating a plurality of second compressed blocks by compressing a plurality of second blocks. Each block of the plurality of second blocks may correspond to one of the plurality of channels. The method may further include dividing the plurality of second compressed blocks into a plurality of second data slices. Each of the plurality of second data slices may include a plurality of portions, such that each portion includes compressed blocks corresponding to a respective one of the plurality of channels. The plurality of first blocks may have a first MIP level different from a second MIP level of the plurality of second blocks. Here, the term "MIP" refers to a multi-resolution scale factor representation commonly used in computer graphics, standing for "Multum in Parvo".

In some implementations, the method may further include generating, based on the plurality of first data slices, an indirection table indicating address information of compressed blocks in the plurality of first data slices.

Various embodiments disclosed herein are related to a device for compressing image data may include one or more processors, coupled to memory. In some implementations, the one or more processors may be configured to identify a plurality of sub-blocks of a block of image data including a first sub-block and a second sub-block. The one or more processors may be further configured to identify a first data characteristic of data of the first sub-block and a second data characteristic of data of the second sub-block. The one or more processors may be further configured to determine a first compression technique based at least on the first data characteristic of the first sub-block. The one or more processors may be further configured to determine a second compression technique based at least on the second data characteristic of the second sub-block. The one or more processors may be further configured to compress the first sub-block using the first compression technique and the second sub-block using the second compression technique.

In some implementations, the second compression technique determined based on the second data characteristic that is different from the first data characteristic, may be different from the first compression technique.

In some implementations, the data characteristic of each of the first and second sub-blocks may be at least one of an image quality, a range of values, a compression rate, or a distortion efficiency. The processor may be further configured to determine a range of values within each of the first and second sub-blocks such that the range of values satisfy a target cost function of (1) a compression rate and (2) a distortion efficiency.

In some implementations, each of the first and second compression techniques may be one of lossless compression, lossy compression, prediction-based compression, or no compression.

In some implementations, the block of image data may correspond to one of a plurality of channels. Each channel may be one of a color channel or an alpha channel.

In some implementations, the one or more processors may be further configured to generate a plurality of first compressed blocks by compressing a plurality of first blocks. Each block of the plurality of first blocks may correspond to one of the plurality of channels. The one or more processors may be further configured to divide the plurality of first compressed blocks into a plurality of first data slices. Each of the plurality of first data slices may include a plurality of portions, such that each portion includes compressed blocks corresponding to a respective one of the plurality of channels. In some implementations, the one or more processors may be further configured to generate a plurality of second compressed blocks by compressing a plurality of second blocks. Each block of the plurality of second blocks may correspond to one of the plurality of channels. The one or more processors may be further configured to divide the plurality of second compressed blocks into a plurality of second data slices. Each of the plurality of second data slices may include a plurality of portions, such that each portion includes compressed blocks corresponding to a respective one of the plurality of channels. The plurality of first blocks may have a first MIP level different from a second MIP level of the plurality of second blocks.

In some implementations, the one or more processors may be further configured to generate, based on the plurality of first data slices, an indirection table indicating address information of compressed blocks in the plurality of first data slices.

Various embodiments disclosed herein are related to a non-transitory computer readable medium storing program instructions for causing one or more processors to identify a plurality of sub-blocks of a block of image data including a first sub-block and a second sub-block. In some implementations, the one or more processors may be further caused to identify a first data characteristic of the first sub-block and a second data characteristic of data of the second sub-block. The one or more processors may be further caused to determine a first compression technique based at least on the first data characteristic of the first sub-block. The one or more processors may be further caused to determine a second compression technique based at least on the second data characteristic of the second sub-block. The one or more processors may be further caused to compress the first sub-block using the first compression technique and the second sub-block using the second compression technique.

In some implementations, the data characteristic of each of the first and second sub-blocks may be at least one of an image quality, a range of values, a compression rate, or a distortion efficiency.

These and other aspects and implementations are discussed in detail below. The foregoing information and the following detailed description include illustrative examples of various aspects and implementations, and provide an overview or framework for understanding the nature and character of the claimed aspects and implementations. The drawings provide illustration and a further understanding of the various aspects and implementations, and are incorporated in and constitute a part of this specification.

BRIEF DESCRIPTION OF THE DRAWINGS

The accompanying drawings are not intended to be drawn to scale. Like reference numbers and designations in the various drawings indicate like elements. For purposes of clarity, not every component can be labeled in every drawing.

FIG. 4 is a table indicating parameters for performing data compression, according to an example implementation of the present disclosure.

FIG. 5 is a table indicating a format of a block header as a result of performing data compression, according to an example implementation of the present disclosure.

DETAILED DESCRIPTION

Figure 1:
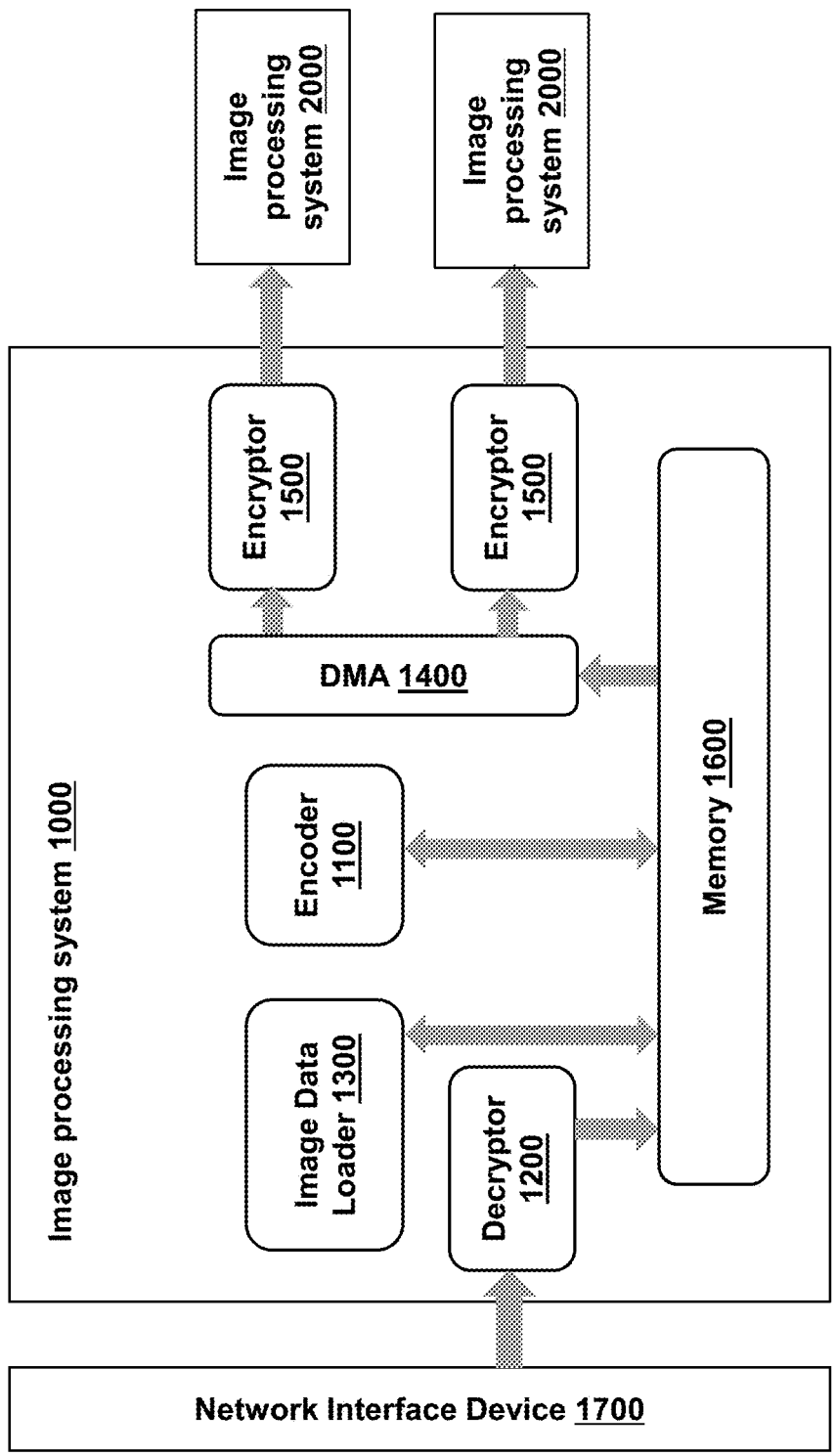
FIG. 1 is a block diagram of an embodiment of a system for processing image data, according to an example implementation of the present disclosure.

It should be understood that the terminology used in the present disclosure is for the purpose of description only and should not be regarded as limiting.

Disclosed herein include embodiments of a system and method for compressing image data, including but not limited to a system and method for compressing different sub-blocks of a block of image data by optimally selecting between different possible compression techniques based on data characteristics of data of the sub-blocks.

One challenge in image data compression relates to reducing storage requirements in performing image data compression. For example, a significant storage space may be required to store texel surface data representing a texture space of image data. Another challenge in image data compression relates to reducing power consumption in transmitting image data (e.g., processed image data) from one image processing system to another system. For example, significant power may be required to transmit texel surface data from a host processor to a display module via a high-speed serial interface. In view of the needs for efficient storage utilization and power consumption, improvements in compression algorithm and data format for image data are desired. In one aspect, compression of a large size of image data can be performed using a single compression technique while the data may contain color channels that have different image characteristics (or data characteristics) in terms of compression efficiency.

To solve this problem, in some implementations, instead of encoding different color channels together using the same encoding method, an image processing system may utilize a block-based image compression format thereby to fetch color channels independently from image data (e.g., texture data) and encode the color channels independently. In some implementations, an image processing system may compress image data containing blocks or sub-blocks based on different image characteristics (or data characteristics) thereof to achieve high energy efficiency and high memory utilization. In some implementations, a block of image data can be divided into multiple sub-blocks and each sub-block can be compressed independently. For example, different sub-blocks having different image characteristics (or data characteristics) in terms of compression efficiency can be compressed in different compression modes, e.g., by optimally selecting between different possible compression techniques. A compression mode of each sub-block can be determined based on image characteristics (or data characteristics) of that sub-block, such as image quality, a range of values, compression rate, distortion efficiency, and so on. In some implementations, each channel of image data (e.g., color channels or alpha channel) can be compressed independently so that different channels of the same image block can be compressed in different compression modes, e.g., by optimally selecting between different possible compression techniques. A compression mode of each channel in the same image block can be determined based on image characteristics (or data characteristics) of that channel, such as image quality, a range of values, compression rate, distortion efficiency, and so on.

In some implementations, an image processing system may perform a plan-of-record (or palette-based) quantization compression algorithm with an indirection table for quick random access to any channel's block of texture data. In some implementations, an indirection table indicating address information of compressed blocks in a plurality of data slices, may be generated to be used by a decoder which needs to access the blocks not in the original raster scan order. In some implementations, sizes of blocks may be embedded with the blocks in a short header. In some implementations, an image processing system may identify or extract sizes of blocks embedded in a short header and then use them to generate an indirection table on-the-fly. In some implementations, an image processing system may have an encoder that is configured to generate and compress a plurality of MIP levels in texture data, for example, up to 4 MIP levels. Here, the term "MIP" refers to a multi-resolution scale factor representation commonly used in computer graphics, standing for "Multum in Parvo". In some implementations, a block of image data may be arranged as a plurality of sub-blocks. For example, a block of 16×16 pixels may be arranged as 2×2 sequence of sub-blocks of 8×8 pixels, or as 4×4 sequence of sub-blocks of 4×4 pixels. In some implementations, a plurality of sub-blocks of a block of image data may contain sub-blocks having different sizes. In some implementations, a decoder of an image processing system may receive input pixel channel samples which are 8 bit data represented in standard Red Green Blue (sRGB (gamma or log)). In some implementations, the decoder may convert 8 bit sRGB input pixel channel samples to linear 13-bit data. In some implementations, encoded image data (e.g., encoded texel surface data) may be transmitted to an image processing system so as to be directly consumed by a decoder of the image processing system.

The systems and methods described in the present disclosure include several advantages over known systems and methods as follows.

In some implementations, an image processing system can determine a compression mode or a compressing technique best for each sub-block of a block of image data in terms of energy efficiency based on image characteristics (or data characteristics) of that sub-block, for example, image quality, a range of values, compression rate, distortion efficiency, thereby achieving high energy efficiency in compressing the whole block. Similarly, in some implementations, the image processing system can determine a compression mode or a compressing technique best for each sub-block of a block in terms of memory utilization in an image storage based on the image characteristics (or data characteristics) of that sub-block, thereby achieving high memory utilization in compressing the whole block. In some implementations, the systems and methods described in the present disclosure can provide the following benefits to a graphics display pipeline for rendering a 3D scene to a 2D screen: (1) texel surface data need to support multiple surfaces with varying persistence, thereby requiring efficient memory utilization. The systems and methods described in the present disclosure can greatly reduce decoder-side storage requirements for texel surface data; and (2) the systems and methods described in the present disclosure can greatly reduce power consumption in a high-speed serial interface when transmitting texel surface data from an encoder-side image processing system to a decoder-side image processing system. In this manner, the systems and methods described in the present disclosure can provide a technique for compressing image data in a manner of energy efficiency and efficient memory utilization in an image storage for an eye-tracking application, for instance.

In some implementations, an image processing system can determine a compression mode or a compressing technique best for each sub-block of a block of image data, thereby making the system more optimally adaptive to the content (e.g., image data) of the block. Compared to conventional GPU textures in which every block (or sub-block) must be the same size, sub-blocks according to some implementations may be the same size, or may be different. The "optimal" selection of compression techniques for a block (or sub-block) depends on the content (e.g., image data) of that block (or sub-block). As an example, an image of a block containing sub-blocks having different data characteristics may be encoded using different compression techniques. On the other hand, a perfectly uniform image of a block may be encoded exactly the same way for every sub-block of that block. Even an image with lots of structure in some areas but constant values in other large areas may be encoded exactly the same way for every sub-block of that block. Such optimal selection of compression techniques can be performed by adapting to the content and independently deciding what is optimal on a per-block basis, which can produce a differently sized compressed representation.

Before turning to the figures, which illustrate certain embodiments in detail, it should be understood that the present disclosure is not limited to the details or methodology set forth in the description or illustrated in the figures.

Figure 2:
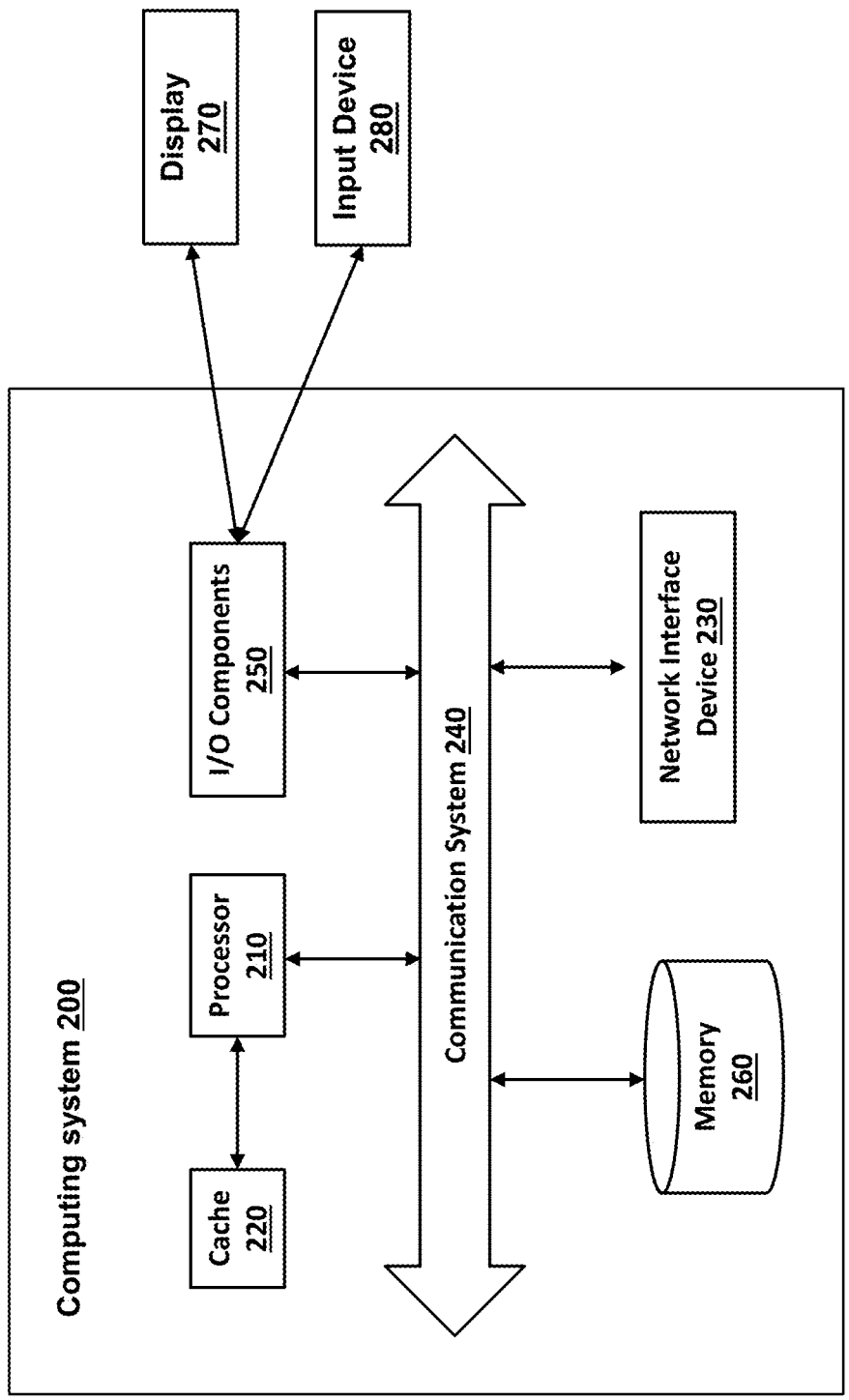
FIG. 2 is a block diagram of an embodiment of a computing system, according to an example implementation of the present disclosure.

FIG. 1 is a block diagram of an embodiment of a system for processing image data, according to an example implementation of the present disclosure. Referring to FIG. 1, in some implementations, an image processing system 1000 may include one or more encoders 1100, one or more decryptors 1200, an image data loader 1300, one or more direct memory accesses (DMAs) 1400, one or more encryptors 1500, and one or more memories 1600. In some implementations, the image processing system 1000 may be implemented with a computing system 200 as illustrated in FIG. 2. For example, the memories 1600 may be implemented with a memory 260 in FIG. 2. The encoders 1100, decryptors 1200, image data loader 1300, and encryptors 1500 may be implemented with a processor 210 in FIG. 2. The one or more encoders 1100 may be implemented with an encoder 7000 in FIG. 7 or an encoder 8000 in FIG. 8.

Referring to FIG. 1, in some implementations, the image processing system 1000 may receive image data from a network interface device 1700 via a high-speed serial interface (e.g., a Mobile Industry Processor Interface (MIPI), a Peripheral Component Interconnect Express (PCIe) interface, and so on). In some implementations, the network interface device 1700 may be implemented with a network interface device 230 in FIG. 2, for example, a network interface device supporting wireless network connections in which an interface port is a wireless (e.g., radio) receiver/transmitter (e.g., for any of the IEEE 802.11 protocols, near field communication "NFC", Bluetooth, ANT, or any other wireless protocol). A computing system 200 in FIG. 2 will be described in more detail in the following sections. Referring back to FIG. 1, in some implementations, the decryptors 1200 may decrypt and store the image data received from the network interface, in the memories 1600. In some implementations, the image data loader 1300 may decode and augment image data (e.g., data representing images and/or videos) decrypted by the decryptors 1200 and store the decoded and augmented image data as one or more frames in the memories 1600. For example, the image data loader 1300 can be implemented with the NVIDIA Data Loading Library (DALI). In some implementations, the image data loader 1300 may generate descriptors (not shown) for each frame and store the descriptors in the memories 1600 to provide parameters for encoding each frame. The descriptors may include but not limited to an address of a buffer (e.g., an input picture buffer), frame dimensions, and an output address of encoded frame.

In some implementations, the one or more encoders 1100 may identify a plurality of blocks in a frame based on a size of block (e.g., 16×16 pixels). In some implementations, the descriptors may include information on a size of blocks (either fixed size or variable size). In some implementations, the one or more encoders 1100 may read a block and convert it to a plurality of blocks having a single channel (single channel blocks). For example, each single channel block may correspond to one of a plurality of channels. In some implementations, each channel may be one of a color channel or an alpha channel. For example, in RGBA color space, each channel may be one of three R (red), G (green), B (blue) color channels or A (alpha) channel. In some implementations, the one or more encoders 1100 may read a block in RGBA color space and convert it to four single channel blocks which correspond to an R channel, a G channel, a B channel, and an A channel. In some implementations, the descriptors may include information for converting a block to multiple single channel blocks, e.g., color encoding systems or color spaces such as YUV, CIE XYZ, RGB, and so on.

In some implementations, the one or more encoders 1100 may identify one or more MIP maps of a frame. In some implementations, the descriptors may include information on an MIP map such as number of MIP levels, and resolutions in an associated MIP map. In some implementations, the one or more encoders 1100 may read a frame of image data and convert it to a plurality of blocks with corresponding MIP levels. For example, each block may correspond to one of a plurality of MIP levels (e.g., up to 4 MIP levels).

In some implementations, the one or more encoders 1100 may be configured to read a frame of image data from a buffer (e.g., a decoded picture buffer), compress the frame and write the compressed data to the memories 1600. In some implementations, the one or more encoders 1100 may use one or more compression techniques such as lossless compression, lossy compression, prediction-based compression, or no compression. In some implementations, the encoders 1100 may read descriptors from the memories 1600 and compress each frame using the descriptors. In some implementations, the encoders 1100 may update the descriptors while or after encoding each frame.

In some implementations, the image processing system 100 may be a display subsystem for implementing a graphics pipeline. In some implementations, each of the image processing system 1000 and image processing systems 2000 (see FIG. 1 and FIG. 9) may be a display subsystem for collaboratively implementing a graphics pipeline. In some implementations, the DMAs 1400 may be display pipeline DMAs (or graphics pipeline DMAs). For example, the DMAs 1400 may include a left display pipeline DMA and a right display pipeline DMA. In some implementations, the left and right display pipeline DMAs 1400 may read compressed data from the memories 1600 and provide the compressed data to the encryptors 1500. In some implementations, the encryptors 1500 may encrypt the compressed data provided from the DMAs 1400 and transmit the encrypted data to one or more image processing systems 2000. The image processing system 2000 will be described in detail with reference to FIG. 9. In some implementations, the encrypted data may be transmitted to the image processing systems via a high-speed display interface, for example, MIPI display serial interface (MIPI DSI). In some implementations, each of the encryptors 1500 may transmit encrypted data to a corresponding image processing system 2000. In some implementations, the image processing system 2000 may decode, decompress and/or merge the data to provide an image.

FIG. 2 is a block diagram of an embodiment of a computing system, according to an example implementation of the present disclosure. Referring to FIG. 2, the illustrated example computing system 200 includes one or more processors 210 in communication, via a communication system 240 (e.g., bus), with memory 260, at least one network interface device 230 (or at least one network interface controller) with network interface port for connection to a network (not shown), and other components, e.g., input/output ("I/O") components 250. Generally, the processor(s) 210 will execute instructions (or computer programs) received from memory. The processor(s) 210 illustrated incorporate, or are directly connected to, cache memory 220. In some instances, instructions are read from memory 260 into cache memory 220 and executed by the processor(s) 210 from cache memory 220.

In more detail, the processor(s) 210 may be any logic circuitry that processes instructions, e.g., instructions fetched from the memory 260 or cache 220. In many implementations, the processor(s) 210 are microprocessor units or special purpose processors. The computing device 200 may be based on any processor, or set of processors, capable of operating as described herein. The processor(s) 210 may be single core or multi-core processor(s). The processor(s) 210 may be multiple distinct processors.

The memory 260 may be any device suitable for storing computer readable data. The memory 260 may be a device with fixed storage or a device for reading removable storage media. Examples include all forms of non-volatile memory, media and memory devices, semiconductor memory devices (e.g., EPROM, EEPROM, SDRAM, and flash memory devices), magnetic disks, magneto optical disks, and optical discs (e.g., CD ROM, DVD-ROM, or Blu-Ray® discs). A computing system 200 may have any number of memory devices 260.

The cache memory 220 is generally a form of computer memory placed in close proximity to the processor(s) 210 for fast read times. In some implementations, the cache memory 220 is part of, or on the same chip as, the processor(s) 210. In some implementations, there are multiple levels of cache 220, e.g., L2 and L3 cache layers.

The network interface device 230 manages data exchanges via the network interface (sometimes referred to as network interface ports). The network interface device 230 handles the physical and data link layers of the OSI model for network communication. In some implementations, some of the network interface controller's tasks are handled by one or more of the processor(s) 210. In some implementations, the network interface device 230 is part of a processor 210. In some implementations, a computing system 200 has multiple network interfaces controlled by a single device 230. In some implementations, a computing system 200 has multiple network interface devices 230. In some implementations, each network interface is a connection point for a physical network link (e.g., a cat-5 Ethernet link). In some implementations, the network interface device 230 supports wireless network connections and an interface port is a wireless (e.g., radio) receiver/transmitter (e.g., for any of the IEEE 802.11 protocols, near field communication "NFC", Bluetooth, ANT, or any other wireless protocol). In some implementations, the network interface device 230 implements one or more network protocols such as Ethernet. Generally, a computing device 200 exchanges data with other computing devices via physical or wireless links through a network interface. The network interface may link directly to another device or to another device via an intermediary device, e.g., a network device such as a hub, a bridge, a switch, or a router, connecting the computing device 200 to a data network such as the Internet.

The computing system 200 may include, or provide interfaces for, one or more input or output ("I/O") devices. Input devices include, without limitation, keyboards, microphones, touch screens, foot pedals, sensors, MIDI devices, and pointing devices such as a mouse or trackball. Output devices include, without limitation, video displays, speakers, refreshable Braille terminal, lights, MIDI devices, and 2-D or 3-D printers.

Other components may include an I/O interface, external serial device ports, and any additional co-processors. For example, a computing system 200 may include an interface (e.g., a universal serial bus (USB) interface) for connecting input devices, output devices, or additional memory devices (e.g., portable flash drive or external media drive). In some implementations, a computing device 200 includes an additional device such as a co-processor, e.g., a math co-processor can assist the processor 210 with high precision or complex calculations.

The components 250 may be configured to connect with external media, a display 270, an input device 280 or any other components in the computing system 3000, or combinations thereof. The display 270 may be a liquid crystal display (LCD), an organic light emitting diode (OLED), a flat panel display, a solid state display, a cathode ray tube (CRT), a projector, a printer or other now known or later developed display device for outputting determined information. The display 270 may act as an interface for the user to see the functioning of the processor(s) 210, or specifically as an interface with the software stored in the memory 260.

The input device 280 may be configured to allow a user to interact with any of the components of the computing system 200. The input device 280 may be a plurality pad, a keyboard, a cursor control device, such as a mouse, or a joystick. Also, the input device 280 may be a remote control, touchscreen display (which may be a combination of the display 270 and the input device 280), or any other device operative to interact with the computing system 200, such as any device operative to act as an interface between a user and the computing system 200.

Figure 3:
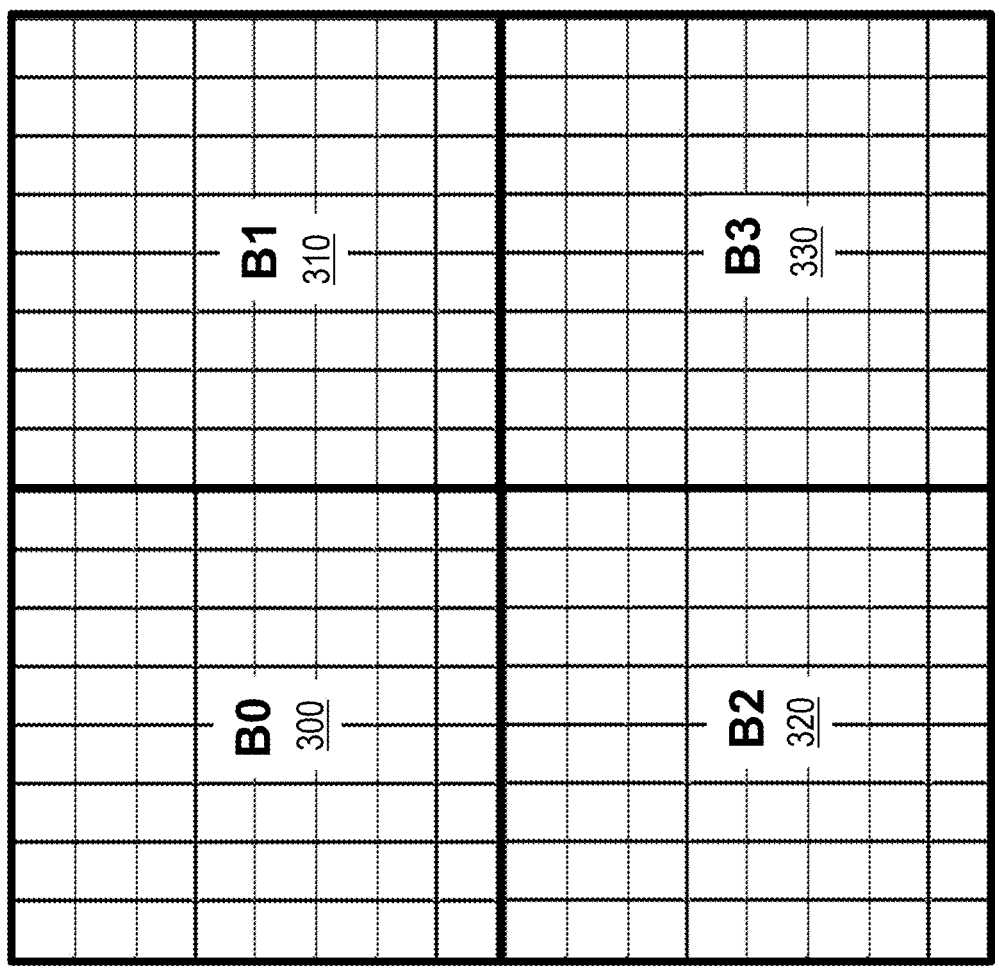
FIG. 3 is a representation of a block of image data for performing data compression, according to an example implementation of the present disclosure.

FIG. 3 is a representation of a block of image data for performing data compression, according to an example implementation of the present disclosure. FIG. 4 is a table indicating parameters for performing data compression, according to an example implementation of the present disclosure. An encoding method according to some implementations of the present disclosure will be described with reference to FIG. 3 and FIG. 4.

In some implementations, image data (e.g., a frame of image data) can be represented as a plurality of blocks. For example, texture data may be divided into a plurality of blocks each of which contains 16×16 pixels as shown in FIG. 3. In some implementations, a block of image data may be divided into a plurality of sub-blocks. In some implementations, a block of 16×16 pixels (e.g., a block shown in FIG. 3) may be divided into four sub-blocks of 8×8 pixels, for example, four sub-blocks B0 (300), B1 (310), B2 (320), B3 (330) as shown in FIG. 3. In some implementations, a block of 16×16 pixels may be divided into 16 sub-blocks of 4×4 pixels.

In some implementations, the image data loader 1300 may identify blocks of each frame and sub-blocks of each block, and generate access information on the blocks and sub-blocks. In some implementations, the image data loader 1300 may write the access information to the descriptors stored in the memories 1600 to provide access information for encoding each block or sub-block of a frame.

In some implementations, the encoders 1100 may determine a coding mode per sub-block (or per block). In some implementations, a coding mode per sub-block may be one of a discrete cosine transform (DCT) type compression mode (e.g., 4×4, 8×8, or basis functions, etc.), a prediction-based compression mode, or an uncompressed mode. In some implementations, the encoders 1100 may compress image data (e.g., frames) by transforming the image data based on the coding mode. In some implementations, a result of the transformation may be quantized and Huffman coded. In some implementations, a size (e.g., byte length) of each compressed block may be variable (not fixed). In some implementations, a size (e.g., byte length) of each compressed sub-block may be variable (not fixed). In some implementations, a size of each compressed sub-block may be indicated in a header so that in response to receiving the header and data of compressed sub-blocks, an indirection table (e.g., a table 1040 in FIG. 10) can be generated.

In some implementations, given a target compression ratio, the encoders 1100 may determine a coding mode per sub-block based on data characteristics of data of that sub-block to achieve a highest overall image quality at the target compression ratio. In some implementations, the encoders 1100 may determine a coding mode per sub-block based on data characteristics of that sub-block to minimize a target cost function which is a function of an image quality and a compression ratio of a sub-block. In some implementations, the encoders 1100 may determine a coding mode per sub-block based on data characteristics of that sub-block to maximize a target objective function which is a function of an image quality and a compression ratio of a sub-block. In some implementations, an image quality can be represented by at least one of distortions, degradations, sharpness, noise, contrast, color accuracy, vignetting, exposure accuracy, or artifacts.

In some implementations, a coding mode of a sub-block based on data characteristics of that sub-block may be a plan-of-record mode (or palette mode) which utilizes a fixed number of bits per pixel sample (or per pixel channel sample if each block corresponds to a channel). In some implementations, to determine a number of bits per pixel sample in a sub-block (e.g., an 8×8 sub-block), the encoders 1100 may determine a range of values in pixel samples within that sub-block to determine endpoints of significance (e.g., a starting endpoint and an ending endpoint) in that sub-block. In some implementations, the encoders 1100 may determine a number of points needed within the determined range that will meet or minimize a target cost function, by using a rate-distortion algorithm. In some implementations, the target cost function may be a function expressing a trade-off between a distortion efficiency and a compression ratio of a sub-block.

In some implementations, the encoders 1100 may determine a number of points per pixel sample by selecting one of 0 bit, 1 bit, 2 bits, 3 bits, 4 bits, 6 bits, or 8 bits, which correspond to number of points of 1, 2, 4, 8, 16, 64, or 256 (or uncompressed), per pixel sample. In other words, there may be 7 candidate plan-of-record modes per sub-block. For example, if 3 bits is selected for a plan-of record mode of a sub-block, the encoders 1100 may compress the sub-block such that up to 8 points can be used per pixel sample in compressed sub-block. If 8 bits is selected for a plan-of record mode of a sub-block (as a simple or low complexity mode), the encoders 1100 may not perform compression on that sub-block.

FIG. 4 is a table indicating parameters for performing data compression, according to an example implementation of the present disclosure. In some implementations, a plan-of-record mode of a sub-block can be determined by three parameters—PRECISION, OFFSET, and SCALE as described in the table in FIG. 4. In some implementations, PRECISION can be represented in 3 bits to define a number of bits per pixel sample used in a given sub-block. For example, values of PRECISION "000", "001", "010", "011", "100" and "110" can indicate the number of points of 1, 2, 4, 8, 16, 64 being used per pixel sample (to represent a pixel sample) in the given sub-block, respectively. In some implementations, the PRECISION value "101" can indicate that the given sub-block is uncompressed (e.g., 256 levels). In some implementations, the PRECISION value "101" can indicate that the given sub-block is uncompressed but that it is not assumed that SCALE=255 or OFFSET=0. In some implementations, the PRECISION value "111" can indicate that the given sub-block is transparent such that the sub-block has no data and is not displayed.

In some implementations, OFFSET can be represented in 8 bits to define a starting endpoint of significance. In some implementations, OFFSET can represent the number of zero values in input pixel samples in the given sub-block. In some implementations, SCALE can be represented in 8 bits to define a range of input values of pixel samples in the given sub-block. In some implementations, SCALE can represent a dynamic range of input values of pixel samples in the given sub-block.

In some implementations, the encoders 1100 may determine the parameters PRECISION, OFFSET and SCALE for each sub-block and compress data of that sub-block (denoted by $E_{Input}$) to output compressed data (denoted by $E_{Output}$) using the following formula $$EOutput = Round((EInput - OFFSET)*(2^{PRECISION-1})/SCALE))$$ Equation (1), where Round(x) means the nearest integer to x.

In some implementations, the encoders 1100 may determine, as a compression technique of a sub-block at least one of lossless compression, lossy compression, prediction-based compression, or no compression based on image characteristics (or data characteristics) of that sub-block (for example, compression ratio, image quality, etc.). For example, one of lossless compression or lossy compression and their corresponding compression format can be selected as a compression technique and a compression format for a sub-block based on a target image quality of that sub-block. If a target compression ratio of a sub-block is relatively high, a prediction-based compression and its corresponding compression format can be used as a compression technique and a compression format for that sub-block. In some implementations, information on compression technique and format used for each sub-block may be stored in a header embedded in a block (in a manner similar to that of the header shown in FIG. 5).

With the foregoing encoding schemes, each sub-block of the same block can be compressed in a different compression mode (e.g., a different compression technique and/or a different compression format) based on image characteristics (or data characteristics) of that sub-block, such as image quality, a range of values, compression rate, distortion efficiency, and so on. Moreover, when applying this encoding scheme to a plurality of single channel blocks, data of each single channel block (e.g., a block of a color channel or alpha channel) can be compressed independently so that different channels of the same image block can be compressed in different compression modes, e.g., by optimally selecting between different possible compression techniques.

Now, data formats relating to data compressed by encoders according to some implementations of the present disclosure will be described with reference to FIG. 5 and FIG. 6.

FIG. 5 is a table indicating a format of a block header as a result of performing data compression, according to an example implementation of the present disclosure.

In some implementations, each encoded block (e.g., a block of 16×16 pixels) may have a header which contain parameters for decoding that encoded block. In some implementations, the encoders (e.g., the encoders 1100 in FIG. 1, the encoder 7000 in FIG. 7, the encoder 8000 in FIG. 8) may generate a header of a block while or after encoding data of the block. For example, each encoded 16×16 pixel block may have a 80-bit header as shown in FIG. 5 which contains decoding parameters PRECISION, OPAQUE, OFFSET, SCALE for each encoded sub-block corresponding to sub-block B0, B1, B2, or B3 (see FIG. 3). Referring to FIG. 5, in some implementations, the fields B0_PRECISION, B1_PRECISION, B2_PRECISION and B3_PRECISION for each encoded sub-block corresponding to sub-block B0, B1, B2, or B3 can be defined in the same manner as the field PRECISION in FIG. 4. Similarly, the fields B0_OFFSET, B1_OFFSET, B2_OFFSET and B3_OFFSET for each encoded sub-block corresponding to sub-block B0, B1, B2, or B3 can be defined in the same manner as the field OFFSET in FIG. 4. Similarly, the fields B0_SCALE, B1_SCALE, B2_SCALE and B3_SCALE for each encoded sub-block corresponding to sub-block B0, B1, B2, or B3 can be defined in the same manner as the field SCALE in FIG. 4. In some implementations, the 1-bit field B0_OPAQUE, B1_OPAQUE, B2_OPAQUE and B3_OPAQUE for each encoded sub-block corresponding to sub-block B0, B1, B2, or B3 can be defined such that '1' indicates that block is opaque and an Alpha (A-channel) decoding is not needed.

In some implementations, a decoder (e.g., one or more decoders 740 in FIG. 10) may read the parameters PRECISION, OFFSET and SCALE for each sub-block of a block from a header of the block (e.g., the block header as shown in FIG. 5) and decode encoded data of that sub-block to output decoded data. The decoding scheme according to some implementations will be described later with reference to FIG. 9.

Figure 6:
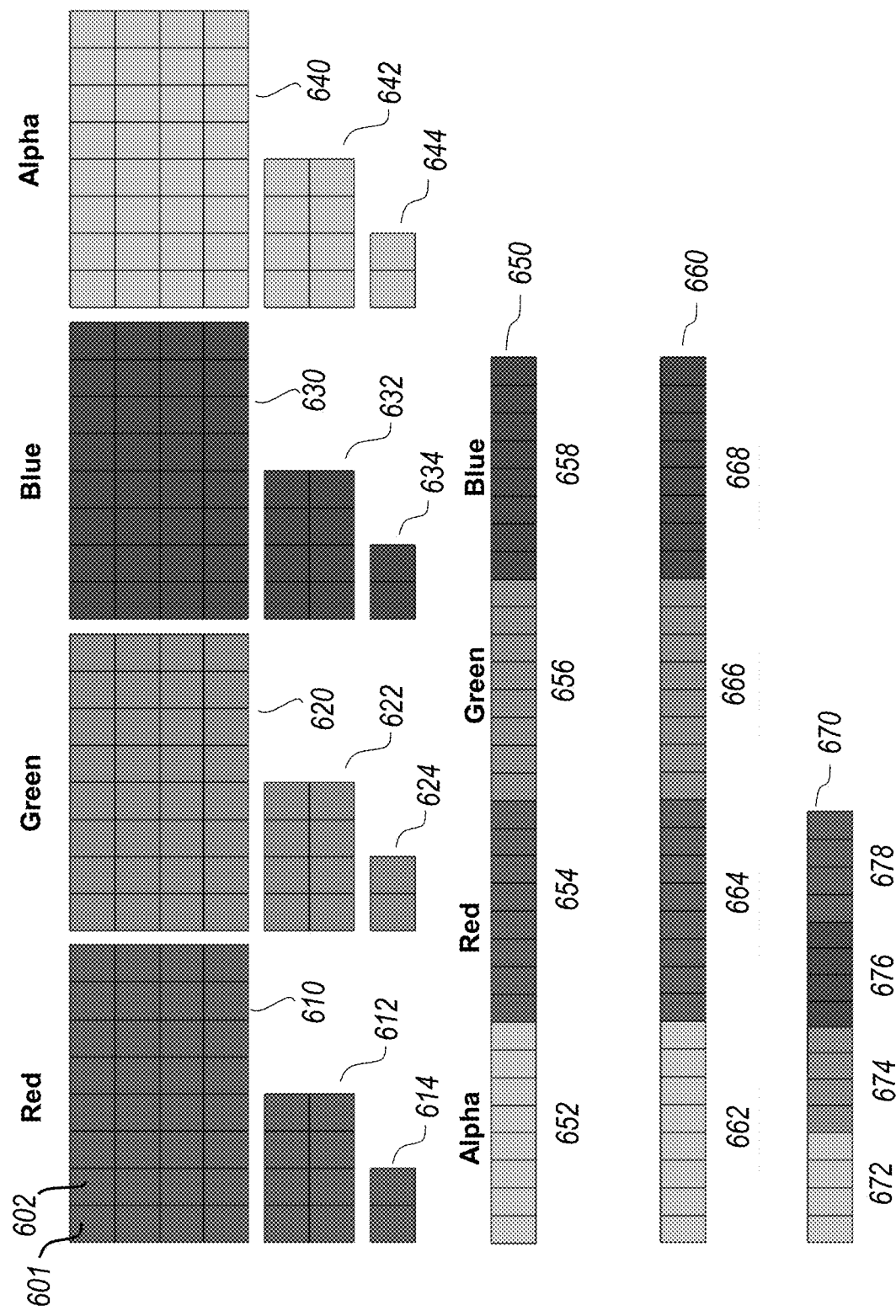
FIG. 6 is a representation of image data as a result of performing data compression, according to an example implementation of the present disclosure.

FIG. 6 is a representation of image data as a result of performing data compression, according to an example implementation of the present disclosure.

In some implementations, the encoders (e.g., the encoders 1100 in FIG. 1, the encoder 7000 in FIG. 7, the encoder 8000 in FIG. 8) may compress a plurality of single channel blocks and output compressed data of each single channel block. For example, FIG. 6 shows compressed data of first R-channel block 601 and compressed data of second R-channel block 602. In some implementations, referring to FIG. 6, as a result of compressing single channel blocks each corresponding to one of R, G, B, A channels, the encoder may output compressed data of R-channel blocks (610, 612, 614), compressed data of G-channel blocks (620, 622, 624), compressed data of B-channel block (630, 632, 634), and compressed data of an A-channel block (640, 642, 644). Each set of compressed data of single channel blocks may include compressed data 610, 620, 630, 640 of a first MIP level (e.g., MIP level 0), compressed data 612, 622, 632, 642 of a second MIP level (e.g., MIP level 1), and compressed data 614, 624, 634, 644 of a third MIP level (e.g., MIP level 2).

In some implementations, based on results of compressing a plurality of single channel blocks, the encoders (e.g., a stream merger 770 of the encoder 7000 in FIG. 7 or a packetizer 830 of the encoder 8000) may generate a coded frame including (1) a header (not shown; e.g., a texture update header) and (2) a payload including a plurality of data slices (e.g., data slices 650, 660, 670 in FIG. 6). In some implementations, each data slice may contain a texture update header (not shown) followed by an integer number of coded (compressed) single channel blocks from a specified color channel.

In some implementations, the encoders may divide compressed data of a plurality of single channel blocks into a plurality of data slices. For example, the encoders may divide a combined portion of compressed data 640 of the A-channel blocks, compressed data 610 of R-channel blocks, compressed data 620 of G-channel blocks, and compressed data 630 of B-channel blocks (which all correspond to the first MIP level) into a plurality of data slices including a data slice 650 and a data slice 660. In some implementations, each of the data slice 650 and the data slice 660 may contain respective portions of compressed A-channel, R-channel, G-channel, B-channel blocks. For example, the data slice 650 includes compressed data 652 of A-channel blocks, compressed data 654 of R-channel blocks, compressed data 656 of G-channel blocks, and compressed data 658 of B-channel blocks in this order. With this order of blocks in a data slice of a frame payload, an encoder-side image processing system (e.g., the image processing system 1000) can send compressed data of A-channel blocks to a decoder-side image processing system (e.g., the image processing system 2000) before sending compressed data of RGB-channel blocks. Similarly, the data slice 660 includes compressed data 662 of A-channel blocks, compressed data 664 of R-channel blocks, compressed data 666 of G-channel blocks, and compressed data 668 of B-channel blocks in this order. In some implementations, a data slice may include the same number of single channel blocks per channel (e.g., each data slice 650, 660 includes 8 single channel blocks per channel).

In some implementations, the encoders may divide a combined portion of compressed data 612 of A-channel blocks, compressed data 622 of R-channel blocks, compressed data 632 of G-channel blocks, and compressed data 642 of B-channel blocks (which all correspond to the second MIP level) into a plurality of data slices including a data slice 670. In some implementations, the number of single channel blocks in a data slice corresponding to the second MIP level (e.g., 16 single channel blocks in the data slice 670 corresponding to MIP level 1) may be smaller than that of the data slice corresponding to the first MIP level (e.g., 32 single channel blocks in the data slice 650 or 660 corresponding to MIP level 0). In some implementations, the data slice 670 includes compressed data 672 of A-channel blocks, compressed data 674 of R-channel blocks, compressed data 676 of G-channel blocks, and compressed data 678 of B-channel blocks in this order.

Here, the block structure hierarchy is described as channels, slices, portions, and MIP levels. In some implementations, the described structure hierarchy indicates a bottom up structure (e.g., blocks to images) while it indicates a top down structure (e.g., images to blocks) in other implementations.

Figure 7:
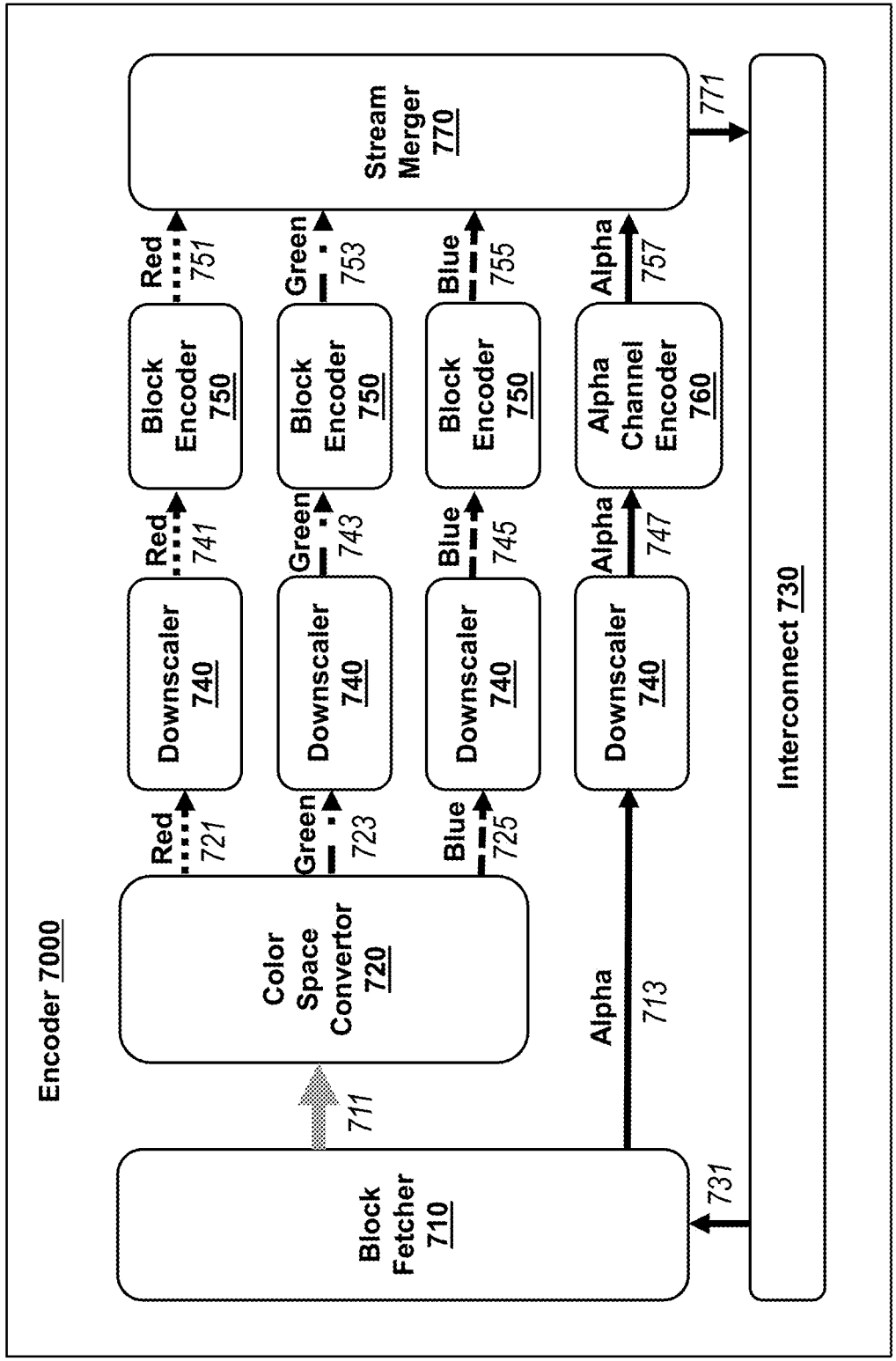
FIG. 7 is a block diagram of an embodiment of an encoder for compressing image data, according to an example implementation of the present disclosure.

FIG. 7 is a block diagram of an embodiment of an encoder for compressing image data, according to an example implementation of the present disclosure. Referring to FIG. 7, in some implementations, an encoder 7000 may include a block fetcher 710, a color space convertor 720 (e.g., YUV to RGB convertor), one or more downscalers 740 (e.g., one or more dyadic downscalers), one or more block encoders 750, a stream merger 770, and an interconnect 730. In some implementations, the interconnect 730 may be implemented with the communication system 240 as illustrated in FIG. 2. In some implementations, the interconnect 730 may be a parallel, synchronous, high-frequency communication interface such as Advanced eXtensible Interface (AXI). In some implementations, the encoder 7000 may be implemented with the computing system 200 in FIG. 2.

Referring to FIG. 7, in some implementations, the block fetcher 710 may be a part of a DMA (e.g., the DMAs 1400 in FIG. 1) or an interface to receive block data from the DMA. In some implementations, the block fetcher 710 may be configured to identify a plurality of blocks in a frame based on a size of block specified in the descriptors, and read or fetch one or more blocks 731 from the memory (e.g., the memories 1600 in FIG. 1) via the interconnect 730. The block fetcher 710 may be configured to provide one or more blocks as an input 711 to the color space convertor 720 or as an input 713 to a downscaler 740 for alpha channel. In some implementations, the block fetcher 710 may convert the one or more blocks to alpha channel blocks and provide the alpha channel blocks as the input 713 to the alpha channel downscaler.

In some implementations, the color space convertor 720 may convert one or more blocks of image data in one color encoding system or color model (e.g., YUV) to blocks in another color encoding system or color model (e.g., RGB). For example, the color space convertor 720 may convert a block of image data encoded in YUV to three single channel blocks, for example, an R-channel block 721, a G-channel block 723, and a B-channel block 735, and provide the converted single channel blocks to the corresponding downscalers 740. The input color space is not limited to YUV and may be native display primaries (in which case no color conversion may be needed), RGB (e.g., AdobeRGB), or an HD video (e.g., Rec709). The output color space is not limited to RGB and may be other than RGB (e.g., CIE XYZ). In some implementations, the output color space is native display primaries (e.g., Digital Cinema Initiatives (DCI)-P3). In some implementations, input image data may be associated with motion vectors, for example, motion vector (x, y). In some implementations, the motion vector (x, y) may have a 16-bit depth such that x*y is a close approximation of depth. In some implementations, the motion vector may have a 8-bit log depth in N4.4 format, for example, depth=$2^{(d/16)}$ which can give the depth in the range 1 to 62757.5 in multiplicative steps of $2^{(1/16)}$=1.044 (2% relative error max).

In some implementations, the block fetcher 710 may identify one or more MIP maps of a frame based on MIP map information (e.g., MIP levels and resolutions) included in the descriptors, and provide one or more blocks of corresponding MIP levels as the input 711 to the color space convertor 720. In some implementations, the color space convertor 720 may convert one or more blocks of the corresponding MIP levels in one color encoding system or color model (e.g., YUV) to blocks in another color encoding system or color model (e.g., RGB).

Referring to FIG. 7, in some implementations, each of the downscalers 740 may be a dyadic downscaler configured to downscale a single channel block down to the ratio of 1, ½, ¼, ⅛, etc. (denoted by "/1", "/2", "/4", "/8" downscales, respectively). The present disclosure, however, is not limited thereto; in some implementations, the downscalers 740 may support downscales other than the dyadic downscales. In some implementations, each of the downscalers 740 may selectively determine a downscale for blocks of different single channels or different MIP levels. For example, the downscalers 740 may select "/1" downscale for RGB single channels of MIP level 0. The downscalers 740 may select downscales other than "/1" for blocks of higher MIP levels (e.g., MIP levels 1, 2, . . . ). In some implementations, the downscalers 740 may selectively determine a downscale for blocks with different sampling ratios. For example, for blocks sampled using the sampling ratio of GRB 4:2:0 in which there is no R-channel blocks of MIP level 0 nor B-channel blocks of MIP level 0, the downscalers 740 may select "/1" for G-channel blocks, "/2" for R-channel blocks, and "/2" for B-channel blocks. The sampling ratio is not limited to GRB 4:2:0 and may be other ratios, for example, RGB 4:4:4.

In some implementations, each of the one or more block encoders 750 may receive, from the downscalers 740, a corresponding downscaled color channel block (e.g., a downscaled R-channel block 741, a downscaled G-channel block 743, a downscaled B-channel block 745), and encode the corresponding downscaled color channel block to be provided as a corresponding input (an encoded R-channel block 751, an encoded G-channel block 753, an encoded B-channel block 755) to the stream merger 770. Similarly, the block encoder 760 for alpha channel may receive, from the downscaler 740, a corresponding downscaled alpha channel block 747, and encode the downscaled alpha channel block to be provided as an input (an encoded A-channel block 757) to the stream merger 770.

In some implementations, each of the block encoders 750 and block encoder 760 may determine parameters PRECISION, OFFSET and SCALE for each sub-block of the corresponding downscaled block and compress data of that sub-block to output compressed data using Equation (1) as described above. In some implementations, each of the block encoders 750 and block encoder 760 may determine, as a compression technique of a sub-block at least one of lossless compression, lossy compression, prediction-based compression, or no compression based on image characteristics (or data characteristics) of that sub-block (for example, compression ratio, image quality, etc.). In some implementations, each block encoder may store information on compression technique and format used for each sub-block of the corresponding block in a header embedded in that block (in a manner similar to that of the header shown in FIG. 5).

In some implementations, the stream merger 770 may receive the encoded color channel blocks (e.g., blocks 751, 753, 755) and the encoded alpha channel blocks (e.g., block 757), merge the received blocks, and provide, via the interconnect 730, an encoder output stream 771 for other image processing to, for example, encryptors (e.g., the encryptors 1500) or decoder-side image processing systems (e.g., the image processing systems 2000). In some implementations, the stream merger 770 may generate a coded frame including (1) a header (not shown; e.g., a texture update header) and (2) a payload including a plurality of data slices (e.g., data slices 650, 660, 670 in FIG. 6). In some implementations, the stream merger 770 may generate each data slice by dividing encoded data of received blocks (e.g., blocks 751, 753, 755, 757) into a plurality of data slices, as described above with reference to FIG. 6.

Figure 8:
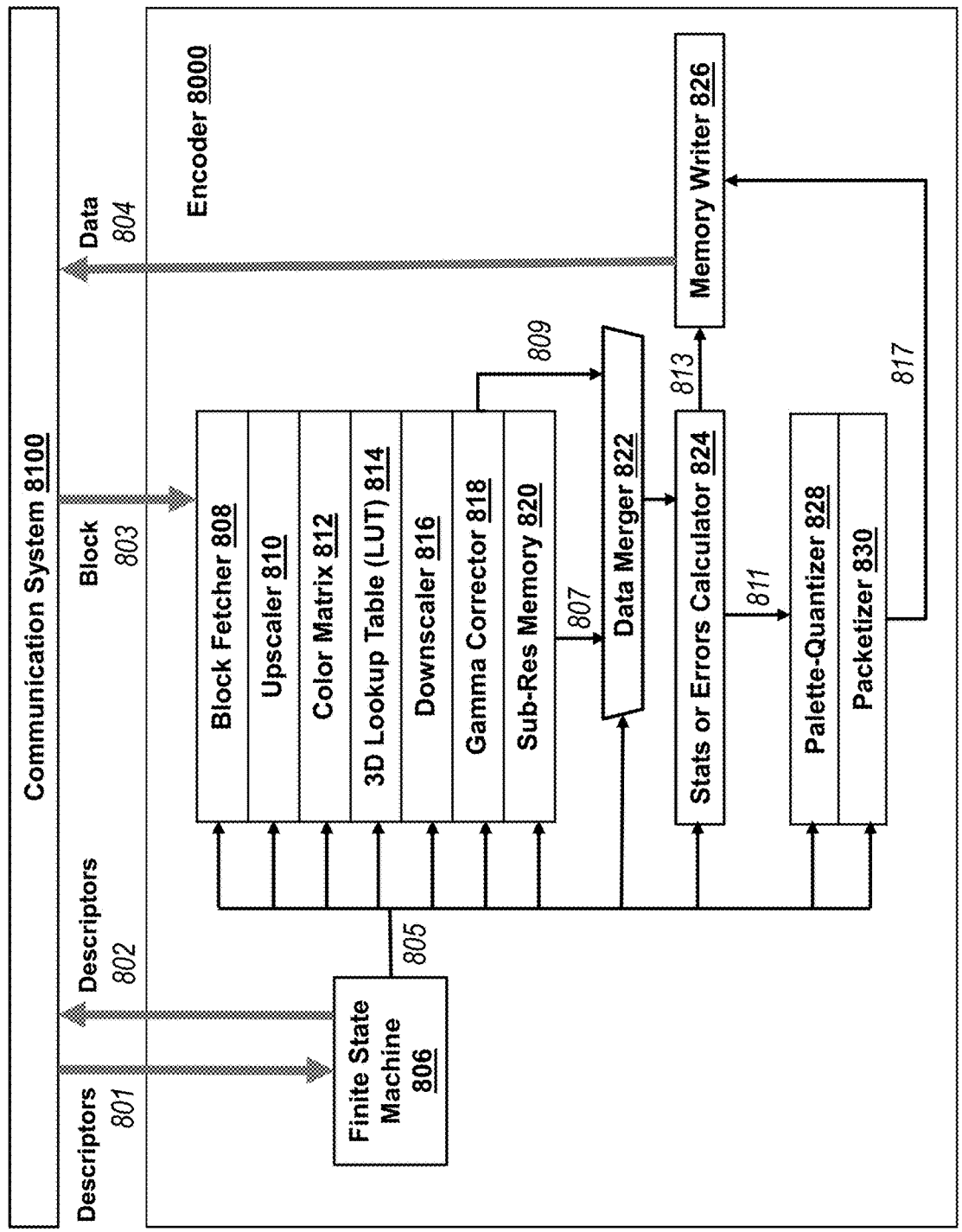
FIG. 8 is a block diagram of another embodiment of an encoder for compressing image data, according to an example implementation of the present disclosure.

FIG. 8 is a block diagram of another embodiment of an encoder for compressing image data, according to an example implementation of the present disclosure. Referring to FIG. 8, in some implementations, an encoder 8000 may include at least one of a finite state machine (FSM) 806, one or more block fetcher 808, one or more upscalers 810, a color matrix 812, a 3D lookup table (LUT) 814, one or more downscalers 816, a gamma corrector 818, a sub-res memory 820, a data merger 822, a stats or errors calculator 824, a memory writer 826, a palette-quantizer 828, and/or packetizer 830. In some implementations, the encoder 8000 may be implemented with the computing system 200 in FIG. 2. In some implementations, encoder 8000 may be configured read/write from/to a memory (e.g., the memories 1600 in FIG. 1) using a memory mapped communication system 804. In some implementations, the memory mapped communication system 804 may be implemented with a memory mapped communication between a master device and a slave device in a parallel high-performance, synchronous communication interface (e.g., Advanced eXtensible Interface (AXI) crossbar).

Referring to FIG. 8, in some implementations, the encoder 8000 may be configured to read/write from/to a memory (e.g., the memories 1600 in FIG. 1) by issuing read/write commands over a communication system 8100. In some implementations, the communication system 8100 may be implemented with the communication system 240 in FIG. 2. In some implementations, the communication system 8100 may be implemented with a parallel high-performance, synchronous communication interface (e.g., Advanced eXtensible Interface (AXI)). In some implementations, the FSM 806 of the encoder 8000 may be configured to access or update control and status registers (CSRs—not shown) of peripheral devices which are connected to a bus for a low bandwidth control access, for example, ARM Advanced Peripheral Bus (APB—not shown).

In some implementations, the FSM 806 of the encoder 8000 may be configured to read descriptors 801 from the memory and parse them to obtain information included therein. In some implementations, the descriptors may include but not limited to an address of a buffer (e.g., an input picture buffer), frame dimensions, and an output address of encoded frame, information on a size of blocks (either fixed size or variable size, and/or information for converting a block to multiple single channel blocks, e.g., color encoding systems or color spaces such as YUV, CIE XYZ, RGB, and so on. In some implementations, the FSM 806 may control the flow of encoding image blocks based on information included in the descriptors. In some implementations, the FSM 806 may determine a sequence of encoding process based on information included in the descriptors. In some implementations, the FSM 806 may determine a state based on information included in the descriptors, select a processing component (among the components 808, 810, 812, 814, 816, 818, 820, 822, 824, 828, 830, for example), and send control information 805 to cause the selected processing component to perform (image data encoding) processing. In some implementations, after the selected processing component completes the processing, the FSM 806 may update the descriptors with information relating to the current state and other update information, by writing the updated descriptors 802 to the memory.

For example, in accordance with the control by the FSM 806, the block fetcher 808 may fetch a block of image data 803 based on address information of the block in the descriptors. The upscaler 810 may upscale UV image texture of the block, if necessary. The FSM 806 may convert the block of image data from one color encoding system or color model (e.g., YUV) to another color encoding system or color model (e.g., RGB) using the color matrix 812 and/or the 3D LUT 814. For example, the block of image data encoded in YUV may be converted to three single channel blocks. The downscaler 816 may downscale a single channel block down to, for example, "/1", "/2", "/4", "/8" downscales. The image data of the block may be optimized by the gamma corrector 818 and/or the sub-res memory 820. In some implementations, the sub-res memory 820 may apply sub-pixel resolution method to the image data of the block. In some implementations, with the sub-res memory, downscaling the images can be done recursively, for example, /1 downscale is used to generate/2 downscale, which is then used to generate/4 downscale, which is then used to generate/8 downscale, etc. The data merger 822 may merge processing results 807, 809 into a block of image data. The states or errors calculator 824 may check states or errors in the block of image data based on information included in the descriptors. In response to determining that there is no errors in the block of image data, the states or errors calculator 824 may send control information 813 to cause the memory writer 826 to write the block (as data 804) to the memory, and send control information 811 to cause the palette-quantizer 828 to perform encoding on the block. In response to determining that there is any errors in the block of image data, the FSM 806 may stop the encoding processing and exit, or perform further processing to fix the errors and resume the encoding processing. Here, errors mean differences between the original pixel values and their compressed version. In some implementations, these differences are expected, and the goal of the compression system is to make them as small as possible, but not to eliminate them because eliminating errors would produce lossless compression, which does not reduce the block size enough.

In some implementations, a palette-quantizer 828 may receive a block of image data and determine parameters PRECISION, OFFSET and SCALE for each sub-block of that image data block and compress data of that sub-block to output compressed data using Equation (1) as described above. In some implementations, the palette-quantizer 828 may store information on compression technique and format used for each sub-block of the corresponding block in a header embedded in that block (in a manner similar to that of the header shown in FIG. 5).

In some implementations, the packetizer 830 may receive the encoded or compressed blocks from the palette-quantizer 828 and generate one or more packets which may be a coded frame including (1) a header (not shown; e.g., a texture update header) and (2) a payload including a plurality of data slices (e.g., data slices 650, 660, 670 in FIG. 6). In some implementations, the packetizer 830 may generate each data slice by dividing encoded or compressed data of received blocks into a plurality of data slices, as described above with reference to FIG. 6. After generating one or more packets 817, the packetizer 830 may send control information 817 to cause the memory writer 826 to write the packets (as data 804) to the memory.

Figure 9:
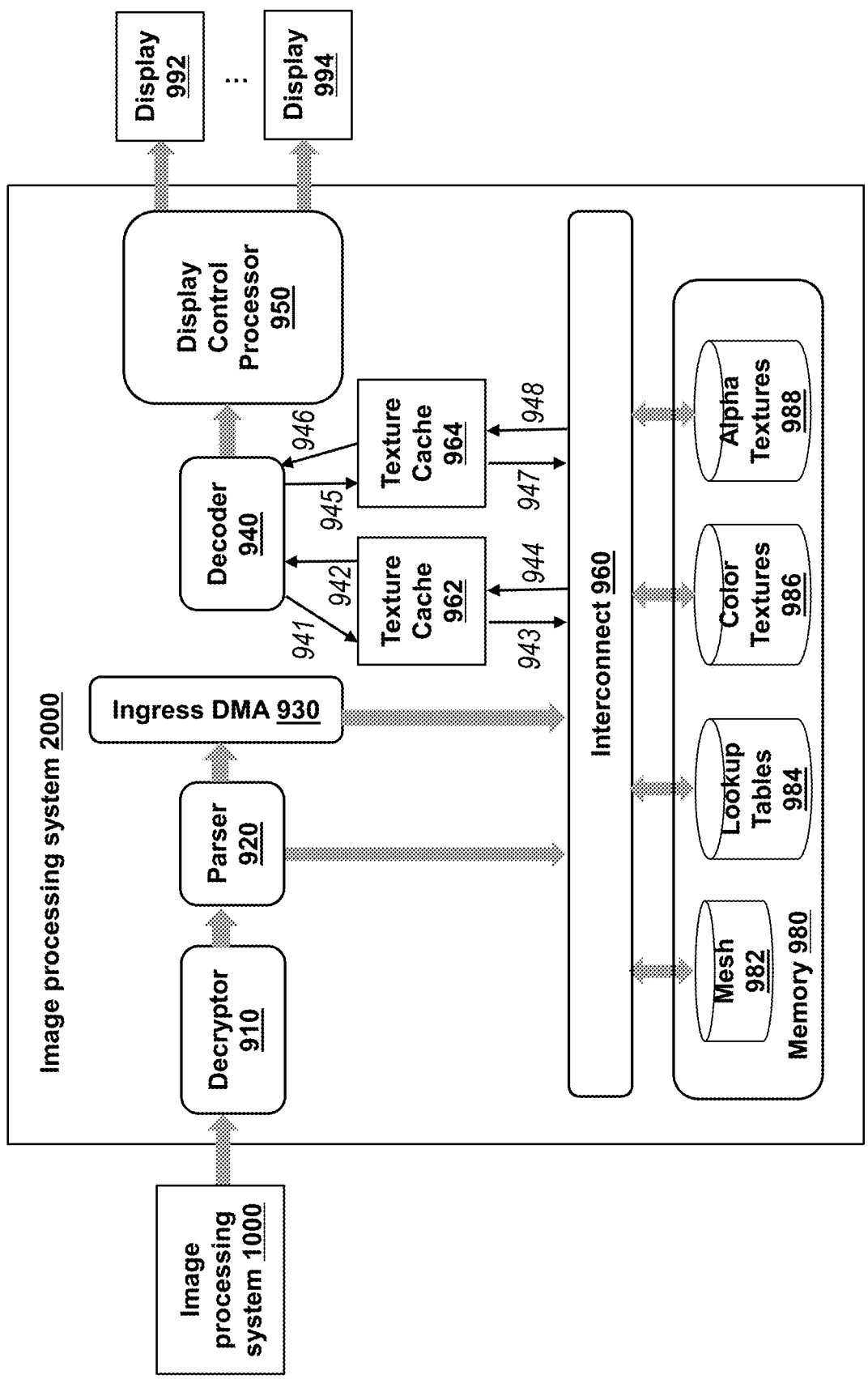
FIG. 9 is a block diagram of an embodiment of a system for processing image data, according to an example implementation of the present disclosure.

FIG. 9 is a block diagram of an embodiment of a system for processing image data, according to an example implementation of the present disclosure. Referring to FIG. 9, in some implementations, an image processing system 2000 may include one or more encoders 940, one or more decryptors 910, a parser 920, one or more ingress direct memory accesses (DMAs) 930, one or more texture caches including a texture cache for color channel blocks 962 and a texture cache for alpha channel blocks 964, a display control processor (DCP) 950, one or more memories 980 including, for example, mesh storage 982, lookup tables storage 984, color textures storage 986, alpha textures storage 988, and an interconnect 960. In some implementations, the image processing system 2000 may be implemented with a computing system 200 as illustrated in FIG. 2. For example, the memories 980 may be implemented with a memory 260 in FIG. 2. The decoders 940, decryptors 910, parser 920, and DCP 950 may be implemented with a processor 210 in FIG. 2. The one or more texture caches 962, 964 may be implemented with a cache 220 in FIG. 2. The interconnect 960 may be implemented with a communication system 240 in FIG. 2. In some implementations, the interconnect 960 may be implemented with one or more network on chips (NoC).

Figure 10:
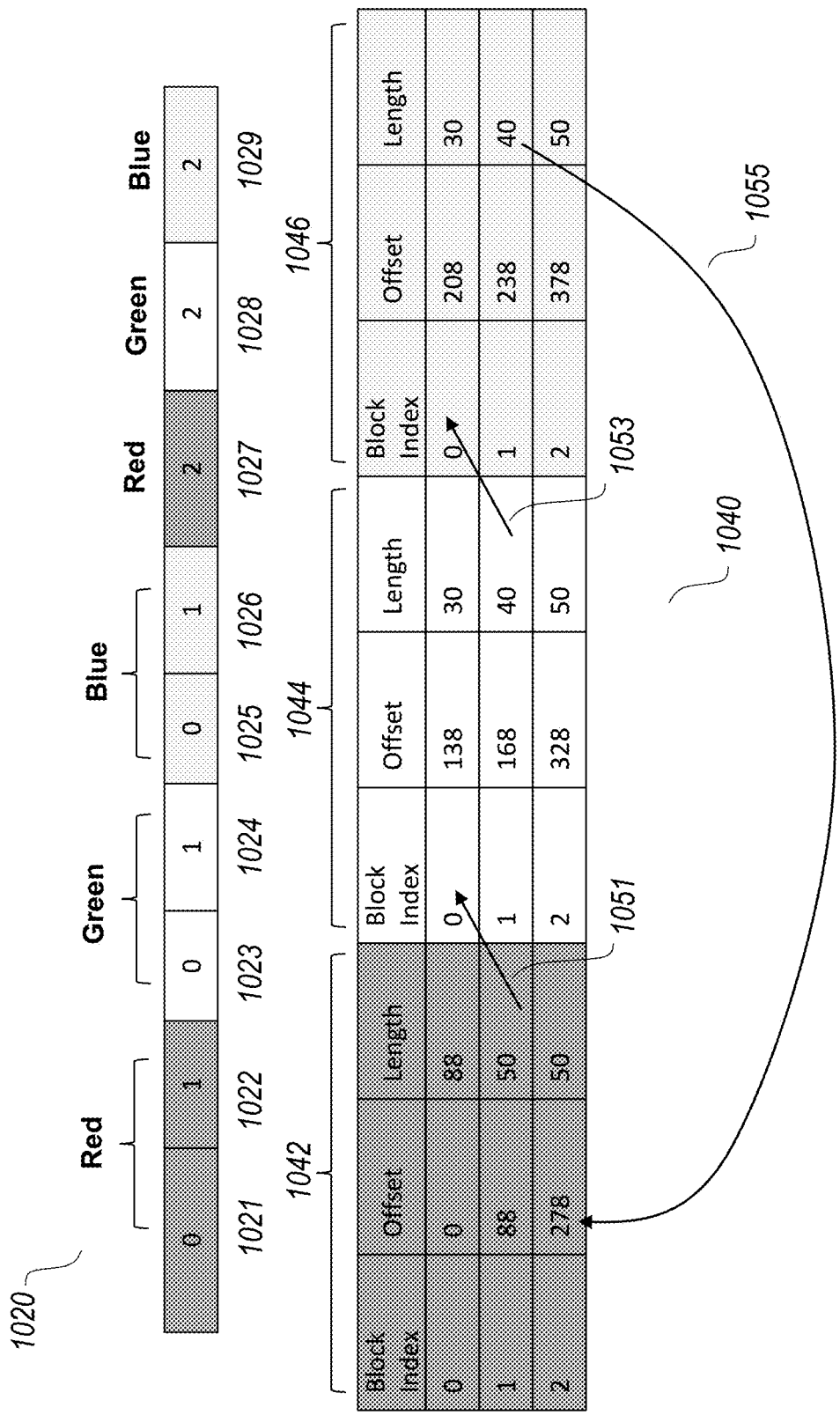
FIG. 10 is an indirection table for performing decoding of image data, according to an example implementation of the present disclosure.

In some implementations, the image processing system 2000 may receive data from an image processing system (e.g., an image processing system 1000 in FIG. 1), and decode, decompress and/or merge the data to provide an image. Referring to FIG. 9, in some implementations, the image processing system 2000 may receive an encoder output stream (e.g., compressed data of a plurality of blocks) from the image processing system 1000 via a high-speed serial interface (e.g., a Mobile Industry Processor Interface (MIPI), a Peripheral Component Interconnect Express (PCIe) interface, and so on). In some implementations, the decryptors 910 may decrypt the received encoder output stream. In some implementations, the parser 920 may parse and store the decrypted encoder output stream, in the memories 980 via the interconnect 960. In some implementations, the parser 920 may perform an ingress process. That is, from the decrypted encoder output stream, the parser 920 may identify mesh data, color textures data (e.g., a plurality of color channel blocks) and alpha textures data (e.g., a plurality of alpha channel blocks) and store them into the mesh storage 982, the color textures storage 986 and the alpha textures storage 988, respectively. In some implementations, from the decrypted encoder output stream, the parser 920 may identify (or calculate or build or generate) address information of each encoded block (e.g., an indirection as shown in FIG. 10) and store the address information in the lookup tables storage 984 as a part of the ingress process. In some implementations, the parser 920 may store the address information in an indirection table (e.g., the indirection table 1040 in FIG. 10) in the lookup tables storage 984. In some implementations, while reading a plurality of encoded blocks from the memories 980, the decoder 940 (or DMAs of the decoder 940) may use the coordinates (e.g., x, y), channel, and/or MIP level of a block to compute a "lookup" address of that block. In some implementations, the decoder 940 may compute a lookup address based on a lookup table (e.g., the indirection table 1040 in FIG. 10), which stores data containing an address for a compressed texture data, for example.

In some implementations, the image processing system 2000 may be a display subsystem for implementing a graphics pipeline. In some implementations, the ingress DMAs 930 may be display pipeline DMAs (or graphics pipeline DMAs). For example, the ingress DMAs 930 may include a left display pipeline DMA and a right display pipeline DMA. In some implementations, the left and right display pipeline DMAs may read compressed data from the memories 980 and write the compressed data to the memory 980. In some implementations, the decoder 940 may decode the compressed data stored in the memory 980. In some implementations, the decoder may have its own DMA to access blocks in the memory 980 as needed. In some implementations, the decoder may access blocks in a non-raster order at different MIP levels based on a head position.

In some implementations, in response to receiving display commands (e.g., MIPI display commands; example commands are shown below in Table 1) sent by the image processing system 1000 and receiving decoded data from the decoder 940, the DCP 950 may provide to one or more displays (e.g., displays 992, 994 as shown in FIG. 9) image data (or video data) including pixel values and synchronization information (e.g., Vsync, Hsync, data enable, and the pixel clock), for example. In some implementations, the DCP 950 may be tightly coupled to the displays including display components such as light emitting diodes (LED), liquid-crystal displays (LCD), or liquid crystal on silicon (LCOS), which can form the image to be displayed for the users to see.

In some implementations, the texture cache 962 may store color channel blocks so that future requests for color channel blocks can be served faster without accessing the color textures storage 986. In some implementations, the decoders 940 may obtain address information of a particular color channel block by accessing an indirection table (e.g., the indirection table 1040 in FIG. 10) stored in the lookup tables storage 984. In some implementations, with the address information, the decoders 940 may send a request 941 for a particular color channel block (e.g., a single channel block corresponding to one of R-channel, G-channel, or B-channel) to the texture cache 962. In some implementations, the request 941 may include one or more of a texture identifier (e.g., 8 bit identifier), a channel, an MIP level, or U values and V values (e.g., 16 U values and 16 V values). A cache hit occurs when the requested particular color channel block can be found in the cache, while a cache miss occurs when it cannot. In some implementations, when a cache miss occurs, the texture cache 962 may identify information on the missed color channel block including one or more of a block identifier (e.g., 2 bit identifier for identifying an 8×8 block), an identifier of a cache entry (or slot), a texture identifier (e.g., 8 bit identifier), an MIP level, or a U value (e.g., 7 bit value) and a V value (e.g., 7 bit value), and look up address information of the missed block on lookup tables (e.g., the lookup tables storage 984) using the identified information. In some implementations, upon a cache miss, the texture cache 962 may remove some cache entry in order to make room for newly retrieved color channel block(s), send a request 943 for the particular color channel block to the color textures storage 986, and receive and store the requested block 944 to serve it to the decoders 940. In some implementations, the request 943 may include address information of the missed block, and the requested block 944 may include at least one of color data (e.g., RGB data of an 8×8 block) or an MIP level (e.g., depth information of an 8×8 block).

Similarly, in some implementations, the decoders 940 may obtain address information of a particular alpha channel block by accessing an indirection table stored in the lookup tables storage 984. In some implementations, with the address information, the decoders 940 may send a request 945 for a particular alpha channel block to the texture cache 964. A cache hit occurs when the requested particular alpha channel block can be found in the cache, while a cache miss occurs when it cannot. Upon a cache miss, the texture cache 964 may remove some cache entry in order to make room for newly retrieved alpha channel block(s), send a request 947 for the particular alpha channel block to the alpha textures storage 988, and receive and store the requested block 948 to serve it to the decoders 940. In some implementations, the requested block 948 may include at least one of alpha channel data (e.g., alpha channel data of an 8×8 block) or alpha channel flags (e.g., information to specify whether alpha blending should be used).

In some implementations, the one or more decoders 940 may read parameters PRECISION, OFFSET and SCALE for each sub-block of a block from a header of the block (e.g., the block header as shown in FIG. 5) and decode encoded data of that sub-block (denoted by $D_{Input}$) to output decoded data (denoted by $D_{Output}$) to the DCP 950 using the following formula:

$$D_{Output} = \text{OFFSET} + (D_{Input} * \text{SCALE}) / (2^{\text{PRECISION}} - 1)) \qquad \text{Equation (2)}$$

In some implementations, a decoder may read the parameter OPAQUE for each sub-block of a block from a header of the block and determine, based on a value of the OPAQUE field, whether that encoded sub-block needs an A-channel decoding. In some implementations, in response to determining that an encoded sub-block needs an A-channel decoding (for example, the OPAQUE value is '0'), the decoder may perform an A-channel decoding on a given sub-block.

In some implementations, the decoders 940 may obtain information on compression technique and format used for each sub-block of a block, from a header embedded in that block, and decode, based on the obtained information, encoded data of that sub-block to output decoded data to the DCP 950. For example, the information obtained from the header may include (1) one of lossy compression, prediction-based compression, or no compression as a compression technique of a sub-block and (2) its corresponding compression format.

Referring to FIG. 9, in some implementations, assuming an encoder output stream (e.g., compressed data of a plurality of blocks) is received from the image processing system 1000 via a MIPI interfaces, an example sequence of MIPI display commands (sent by the image processing system 1000 to the image processing system 2000) and operations carried out by the system 2000 (e.g., by the DCP 950 of the system 2000) in response to the commands are shown below in Table 1.

TABLE 1

| Sequence Number | Commands | Operations in receiving side (e.g., system 2000) |
|---|---|---|
| 1 | VSYNC (time) | Vertical synchronization |
| 2 | Surface 1 Setup | Set up a frame buffer (memory) address for surface texture of MIP level 1 |
| 3 | Surface 1 Texture Update | Receive blocks of surface texture of MIP level 1 |
| 4 | Surface 2 Setup | Set up a frame buffer address for surface texture of MIP level 2 |
| 5 | Surface 2 Texture Update | Receive blocks of surface texture of MIP level 2 |
| 6 | Surface 2 Texture Update | Receive blocks of surface texture of MIP level 2 |
| 7 | DONE 1 | Complete processing of surface texture of MIP level 1; release frame buffer for surface texture of MIP level 1 |
| 8 | Surface 2 Texture Update | Receive blocks of surface texture of MIP level 2 |
| 9 | DONE 2 | Complete processing of surface of MIP level 2; release frame buffer for surface texture of MIP level 2 |
| . . . | . . . | |
| N | VSYNC (time) | Vertical synchronization |
| N + 1 | Surface 2 Texture Update | Receive blocks of surface texture of MIP level 2 (reuse frame buffer address already set up before; in other words, this command should be preceded by a Surface 2 Setup) |
| N + 2 | Surface 3 Setup | Set up frame buffer address for surface texture of MIP level 3 |
| N + 3 | Surface 3 Texture Update | Receive blocks of surface texture of MIP level 3 |
| N + 4 | DONE 3 | Complete processing of surface of MIP level 3; release frame buffer for surface texture of MIP level 3 |
| N + 5 | Surface 2 Texture Update | Receive blocks of surface texture of MIP level 2 |
| N + 6 | DONE 2 | Complete processing of surface of MIP level 2 |

In some implementations, each surface may be updated without any overlap with updates of other surfaces. For example, for MIP level i, the sequence of "Surface i Setup", "Surface i Texture Update", "DONE i" may be performed without any intervening operations.

FIG. 10 is an indirection table for performing decoding of image data, according to an example implementation of the present disclosure.

Referring to FIG. 10, an image processing system (e.g., the image processing system 2000 in FIG. 9) may receive an encoder output stream from an encoder-side image processing system (e.g., the image processing system 1000 in FIG. 9) and store the encoder output stream in a memory (e.g., the color textures storage 986 or the alpha textures storage 988 in FIG. 9). In some implementations, the encoder output stream may include a coded frame containing a data slice 1020 as a payload of the coded frame. In some implementations, the data slice may include compressed data of single channel blocks corresponding to different channels (e.g., a color channel or an alpha channel). In some implementations, the data slice 1020 may include compressed data of single channel blocks of a first MIP level (e.g., MIP level 1) corresponding a first channel (e.g., R-channel blocks 1021, 1022), compressed data of single channel blocks of the first MIP level corresponding a second channel (e.g., G-channel blocks 1023, 1024), compressed data of single channel blocks of the first MIP level corresponding a third channel (e.g., B-channel blocks 1025, 1026), compressed data of single channel blocks of a second MIP level (e.g., MIP level 2) corresponding the first channel (e.g., R-channel block 1027), compressed data of single channel blocks of the second MIP level corresponding the second channel (e.g., G-channel block 1028) and compressed data of single channel blocks of the second MIP level corresponding the third channel (e.g., B-channel block 1029), in this order. In some implementations, the size (e.g., byte length) of each single channel block may be variable. In some implementations, the size of a block may be embedded with the block in a header thereof (not shown).

In some implementations, an image processing system (e.g., the parser 920 or the DMA 730 of the image processing system 2000) may identify or extract the size of each block (e.g., each single channel block 1021-1029 in FIG. 10) from a header thereof while reading the blocks from the memory, and generate an indirection table 1040 on the fly based on the identified or extracted block sizes. In some implementations, the image processing system 2000 may identify or extract the size of each block from a header thereof while storing the blocks in the memory. In some implementations, the image processing system 2000 may store the indirection table 1040 in a memory (e.g., the lookup tables 984 in FIG. 9). In some implementations, the indirection table 1040 may include a plurality of sub-tables for blocks of respective channels (e.g., a sub-table 1042 for R-channel blocks, a sub-table 1044 for G-channel blocks, a sub-table 1046 for B-channel blocks in FIG. 10). In some implementations, the indirection table may include a plurality of entries for corresponding blocks. In some implementations, each entry of the indirection table may store address information of the corresponding block in the memory, such as block index, offset (in the payload) and/or length of the block. In some implementations, each entry of the indirection table may store information for decoding sub-blocks of the corresponding block. For example, an entry of the indirection table may store a block header of the corresponding block similar to that shown in FIG. 5.

In some implementations, the indirection table may be generated or built or populated as the image processing system 200 identifies or extracts the size of each block while reading the blocks of the data slice from the memory in the order of storing them (e.g., from the block 1021 to the block 1029 in FIG. 10). For example, as shown in FIG. 10, the image processing system 200 identifies or extracts byte lengths of the blocks 1021 to 1029 as 88, 50, 30, 40, 30, 40, 50, 50, 50. Assuming the starting address of the block 1021 in the memory is zero, as it identifies or extracts size information of the blocks 1021, 1022, the image processing system 200 may first calculate block index and offset of the blocks 1021, 1022 based on the sizes of those blocks, and write the block index and offset to the sub-table 1042. Then, as it identifies or extracts size information of the blocks 1023, 1024 of G-channel, the image processing system 200 may locate the sub-table 1044 (indicated by arrow 1051 in FIG. 10), calculate block index and offset of the blocks 1023, 1024 based on the sizes of those blocks, and write the block index and offset to the sub-table 1044. Then, as it identifies or extracts size information of the blocks 1025, 1026 of B-channel, the image processing system 200 may locate the sub-table 1046 (indicated by arrow 1053 in FIG. 10), calculate block index and offset of the blocks 1025, 1026 based on the sizes of those blocks, and write the block index and offset to the sub-table 1046. Then, as it identifies or extracts size information of the block 1027 of R-channel, the image processing system 200 may refer back to the sub-table 1042 (indicated by arrow 1055 in FIG. 10), calculate block index and offset of the block 1027 based on the size of that block, and write the block index and offset to the sub-table 1042.

In some implementations, a device for compressing image data may include one or more processors (e.g., the processor 210 in FIG. 2), coupled to memory (e.g., the memory 260 in FIG. 2 or the memories 1600 in FIG. 1). The one or more processors may be configured to identify a plurality of sub-blocks of a block of image data (e.g., sub-blocks B0, B1, B2, B3 in FIG. 3). The one or more processors may be further configured to identify a first data characteristic of data of a first sub-block of the block of image data (e.g., a range of values in pixel samples within that sub-block) and a second data characteristic of data of a second sub-block of the block of image data (e.g., a range of values in pixel samples within that sub-block). The one or more processors may be further configured to determine a first compression technique (e.g., a compression with PRECISION, OFFSET and SCALE in FIG. 4) based at least on the first data characteristic of the first sub-block. The one or more processors may be further configured to determine, based at least on the second data characteristic of the second sub-block, a second compression technique (e.g., a compression with PRECISION, OFFSET and SCALE in FIG. 4) that is different from the first compression technique. The one or more processors (e.g., via the block encoder 750 in FIG. 7 or the palette-quantizer 828 in FIG. 8) may be further configured to compress the first sub-block using the first compression technique and the second sub-block using the second compression technique.

In some implementations, the data characteristic of each of the first and second sub-blocks may be at least one of an image quality, a range of values (e.g., a range of values in pixel samples within a sub-block), a compression rate, or a distortion efficiency. The processor may be further configured to determine a range of values within each of the first and second sub-blocks such that the range of values satisfy a target cost function of (1) a compression rate and (2) a distortion efficiency (e.g., a function expressing a trade-off between a distortion efficiency and a compression ratio of a sub-block).

In some implementations, each of the first and second compression techniques may be one of lossless compression, lossy compression, prediction-based compression, or no compression. In some implementations, the compressed first sub-block may have a compression format different from a compression format of the compressed second sub-block. For example, one of lossless compression or lossy compression and their corresponding compression format can be selected as a compression technique and a compression format for a sub-block based on a target image quality of that sub-block. If a target compression ratio of a sub-block is relatively high, a prediction-based compression and its corresponding compression format can be used as a compression technique and a compression format for that sub-block.

In some implementations, the block of image data may correspond to one of a plurality of channels. Each channel may be one of a color channel or an alpha channel. For example, referring to FIG. 7, the color space convertor 720 may convert a block of image data encoded in YUV to three single channel blocks, for example, an R-channel block 721, a G-channel block 723, and a B-channel block 735.

In some implementations, the one or more processors may be further configured to generate a plurality of first compressed blocks (e.g., compressed blocks 610, 620, 630, 640 in FIG. 6) by compressing a plurality of first blocks. Each block of the plurality of first blocks may correspond to one of the plurality of channels (e.g., compressed R-channel block 610, compressed G-channel block 620, compressed B-channel block 630, and compressed A-channel block 640). The one or more processors may be further configured to divide the plurality of first compressed blocks into a plurality of first data slices (e.g., data slices 650, 660 in FIG. 6). Each of the plurality of first data slices may include a plurality of portions, such that each portion includes compressed blocks corresponding to a respective one of the plurality of channels (e.g., the data slice 650 includes compressed data 652 of A-channel blocks, compressed data 654 of R-channel blocks, compressed data 656 of G-channel blocks, and compressed data 658 of B-channel blocks in FIG. 6).

In some implementations, the one or more processors may be further configured to generate a plurality of second compressed blocks (e.g., compressed blocks 612, 622, 632, 642 in FIG. 6) by compressing a plurality of second blocks. Each block of the plurality of second blocks may correspond to one of the plurality of channels (e.g., compressed R-channel block 612, compressed G-channel block 622, compressed B-channel block 632, and compressed A-channel block 642). The one or more processors may be further configured to divide the plurality of second compressed blocks into a plurality of second data slices (e.g., data slice 670 in FIG. 6). Each of the plurality of second data slices may include a plurality of portions, such that each portion includes compressed blocks corresponding to a respective one of the plurality of channels (e.g., the data slice 670 includes compressed data 672 of A-channel blocks, compressed data 674 of R-channel blocks, compressed data 676 of G-channel blocks, and compressed data 678 of B-channel blocks in FIG. 6). The plurality of first blocks may have a first MIP level (e.g., MIP level 0 of the compressed blocks 610, 620, 630, 640 in FIG. 6) different from a second MIP level of the plurality of second blocks (e.g., MIP level 1 of the compressed blocks 612, 622, 632, 642 in FIG. 6).

In some implementations, the one or more processors may be further configured to generate, based on the plurality of first data slices (e.g., the data slice 1020 in FIG. 10), an indirection table (e.g., the indirection table 1040 in FIG. 10) indicating address information (e.g., offset and length fields in the indirection table 1040 in FIG. 10) of compressed blocks in the plurality of first data slices.

In some implementations, a non-transitory computer readable medium storing program instructions for causing one or more processors (e.g., the processor 210 in FIG. 2) to identify a plurality of sub-blocks of a block of image data (e.g., sub-blocks B0, B1, B2, B3 in FIG. 3). The one or more processors may be further caused to identify a first data characteristic of data of a first sub-block of the block of image data (e.g., a range of values in pixel samples within that sub-block) and a second data characteristic of data of a second sub-block of the block of image data (e.g., a range of values in pixel samples within that sub-block). The one or more processors may be further caused to determine a first compression technique (e.g., a compression with PRECISION, OFFSET and SCALE in FIG. 4) based at least on the first data characteristic of the first sub-block. The one or more processors may be further caused to determine, based at least on the second data characteristic of the second sub-block, a second compression technique (e.g., a compression with PRECISION, OFFSET and SCALE in FIG. 4) that is different from the first compression technique. The one or more processors (e.g., via the block encoder 750 in FIG. 7 or the palette-quantizer 828 in FIG. 8) may be further caused to compress the first sub-block using the first compression technique and the second sub-block using the second compression technique. In some implementations, the data characteristic of each of the first and second sub-blocks may be at least one of an image quality, a range of values (e.g., a range of values in pixel samples within a sub-block), a compression rate, or a distortion efficiency.

Figure 11:
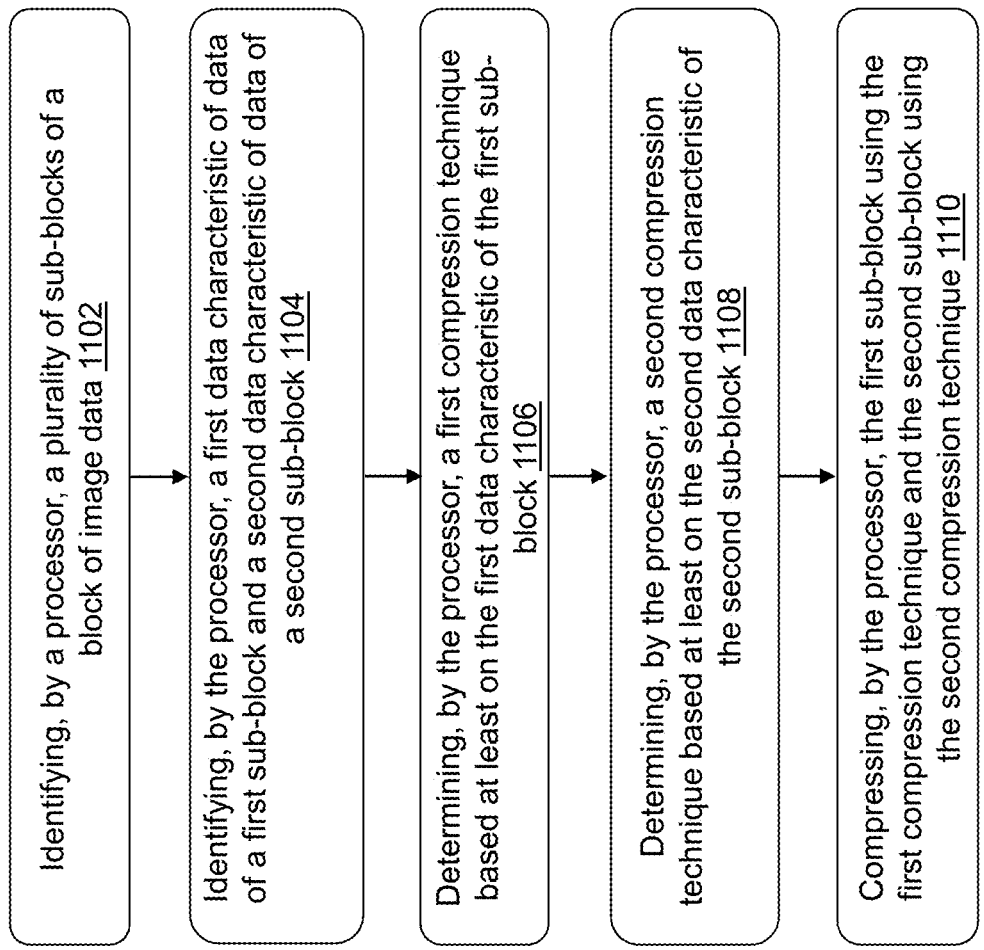
FIG. 11 is a flow chart illustrating a process to compress a block of image data, according to an example implementation of the present disclosure.

FIG. 11 is a flow chart illustrating a process to compress a block of image data, according to an example implementation of the present disclosure. In some implementations, the method includes identifying, by a processor, a plurality of sub-blocks of a block of image data (1102). The method can include identifying, by the processor, a first data characteristic of data of a first sub-block of the block of image data and a second data characteristic of data of a second sub-block of the block of image data (1104). The method can include determining, by the processor, a first compression technique based at least on the first data characteristic of the first sub-block (1106). The method can include determining a second compression technique by the processor based at least on the second data characteristic of the second sub-block (1108). The method can include compressing, by the processor, the first sub-block using the first compression technique and the second sub-block using the second compression technique (1110).

In further details of 1102, and in some implementations, a processor (e.g., the processor 210 in FIG. 2) may identify a plurality of sub-blocks of a block of image data (e.g., sub-blocks B0, B1, B2, B3 in FIG. 3).

In further details of 1104, and in some implementations, the processor may identify a first data characteristic (e.g., a range of values in pixel samples within that sub-block) of data of a first sub-block of the block of image data and a second data characteristic (e.g., a range of values in pixel samples within that sub-block) of data of a second sub-block of the block of image data. In some implementations, the data characteristic of each of the first and second sub-blocks may be at least one of an image quality, a range of values, a compression rate, or a distortion efficiency. In some implementations, the processor may determine a range of values within each of the first and second sub-blocks such that the range of values satisfy a target cost function of (1) a compression rate and (2) a distortion efficiency (e.g., a function expressing a trade-off between a distortion efficiency and a compression ratio of a sub-block).

In some implementations, the block of image data may correspond to one of a plurality of channels. Each channel may be one of a color channel or an alpha channel. For example, referring to FIG. 7, the color space convertor 720 may convert a block of image data encoded in YUV to three single channel blocks, for example, an R-channel block 721, a G-channel block 723, and a B-channel block 735.

In further details of 1106, and in some implementations, the processor may determine a first compression technique (e.g., a compression with PRECISION, OFFSET and SCALE in FIG. 4) based at least on the first data characteristic of the first sub-block (e.g., a range of values in pixel samples within that sub-block).

In further details of 1108, and in some implementations, the processor may determine, based at least on the second data characteristic of the second sub-block (e.g., a range of values in pixel samples within that sub-block), a second compression technique (e.g., a compression with PRECISION, OFFSET and SCALE in FIG. 4). In some implementations, the second compression technique determined based on the second data characteristic that is different from the first data characteristic, is different from the first compression technique. In some implementations, each of the first and second compression techniques may be one of lossless compression, lossy compression, prediction-based compression, or no compression. In some implementations, the compressed first sub-block may have a compression format different from a compression format of the compressed second sub-block. For example, one of lossless compression or lossy compression and their corresponding compression format can be selected as a compression technique and a compression format for a sub-block based on a target image quality of that sub-block. If a target compression ratio of a sub-block is relatively high, a prediction-based compression and its corresponding compression format can be used as a compression technique and a compression format for that sub-block.

In further details of 1110, and in some implementations, the processor (e.g., via the block encoder 750 in FIG. 7 or the palette-quantizer 828 in FIG. 8) may compress the first sub-block using the first compression technique (e.g., a compression with PRECISION, OFFSET determined based on the data characteristics of the first sub-block) and the second sub-block using the second compression technique (e.g., a compression with PRECISION, OFFSET determined based on the data characteristics of the second sub-block).

In some implementations, the method may further include generating a plurality of first compressed blocks (e.g., compressed blocks 610, 620, 630, 640 in FIG. 6) by compressing a plurality of first blocks. Each block of the plurality of first blocks may correspond to one of the plurality of channels (e.g., compressed R-channel block 610, compressed G-channel block 620, compressed B-channel block 630, and compressed A-channel block 640). The method may further include dividing the plurality of first compressed blocks into a plurality of first data slices (e.g., data slices 650, 660 in FIG. 6). Each of the plurality of first data slices may include a plurality of portions, such that each portion includes compressed blocks corresponding to a respective one of the plurality of channels (e.g., the data slice 650 includes compressed data 652 of A-channel blocks, compressed data 654 of R-channel blocks, compressed data 656 of G-channel blocks, and compressed data 658 of B-channel blocks in FIG. 6).

In some implementations, the method may further include generating a plurality of second compressed blocks (e.g., compressed blocks 612, 622, 632, 642 in FIG. 6) by compressing a plurality of second blocks. Each block of the plurality of second blocks may correspond to one of the plurality of channels (e.g., compressed R-channel block 612, compressed G-channel block 622, compressed B-channel block 632, and compressed A-channel block 642). The method may further include dividing the plurality of second compressed blocks into a plurality of second data slices (e.g., data slice 670 in FIG. 6). Each of the plurality of second data slices may include a plurality of portions, such that each portion includes compressed blocks corresponding to a respective one of the plurality of channels (e.g., the data slice 670 includes compressed data 672 of A-channel blocks, compressed data 674 of R-channel blocks, compressed data 676 of G-channel blocks, and compressed data 678 of B-channel blocks in FIG. 6). The plurality of first blocks may have a first MIP level (e.g., MIP level 0 of the compressed blocks 610, 620, 630, 640 in FIG. 6) different from a second MIP level of the plurality of second blocks (e.g., MIP level 1 of the compressed blocks 612, 622, 632, 642 in FIG. 6).

In some implementations, the method may further generating, based on the plurality of first data slices (e.g., the data slice 1020 in FIG. 10), an indirection table (e.g., the indirection table 1040 in FIG. 10) indicating address information (e.g., offset and length fields in the indirection table 1040 in FIG. 10) of compressed blocks in the plurality of first data slices.

Having now described some illustrative implementations, it is apparent that the foregoing is illustrative and not limiting, having been presented by way of example. In particular, although many of the examples presented herein involve specific combinations of method acts or system elements, those acts and those elements can be combined in other ways to accomplish the same objectives. Acts, elements and features discussed in connection with one implementation are not intended to be excluded from a similar role in other implementations.

The hardware and data processing components used to implement the various processes, operations, illustrative logics, logical blocks, modules and circuits described in connection with the embodiments disclosed herein may be implemented or performed with a general purpose single- or multi-chip processor, a digital signal processor (DSP), an application specific integrated circuit (ASIC), a field programmable gate array (FPGA), or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices, such as a combination of a DSP and a microprocessor, a plurality of microprocessors, one or more microprocessors in conjunction with a DSP core, or any other such configuration. In some implementations, particular processes and methods may be performed by circuitry that is specific to a given function. The memory (e.g., memory, memory unit, storage device, etc.) may include one or more devices (e.g., RAM, ROM, Flash memory, hard disk storage, etc.) for storing data and/or computer code for completing or facilitating the various processes, layers and modules described in the present disclosure. The memory may be or include volatile memory or non-volatile memory, and may include database components, object code components, script components, or any other type of information structure for supporting the various activities and information structures described in the present disclosure. According to an exemplary embodiment, the memory is communicably connected to the processor via a processing circuit and includes computer code for executing (e.g., by the processing circuit and/or the processor) the one or more processes described herein.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

The phraseology and terminology used herein is for the purpose of description and should not be regarded as limiting. The use of "including" "comprising" "having" "containing" "involving" "characterized by" "characterized in that" and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular can also embrace implementations including a plurality of these elements, and any references in plural to any implementation or element or act herein can also embrace implementations including only a single element. References in the singular or plural form are not intended to limit the presently disclosed systems or methods, their components, acts, or elements to single or plural configurations. References to any act or element being based on any information, act or element can include implementations where the act or element is based at least in part on any information, act, or element.

Any implementation disclosed herein can be combined with any other implementation or embodiment, and references to "an implementation," "some implementations," "one implementation" or the like are not necessarily mutually exclusive and are intended to indicate that a particular feature, structure, or characteristic described in connection with the implementation can be included in at least one implementation or embodiment. Such terms as used herein are not necessarily all referring to the same implementation. Any implementation can be combined with any other implementation, inclusively or exclusively, in any manner consistent with the aspects and implementations disclosed herein.

Where technical features in the drawings, detailed description or any claim are followed by reference signs, the reference signs have been included to increase the intelligibility of the drawings, detailed description, and claims. Accordingly, neither the reference signs nor their absence have any limiting effect on the scope of any claim elements.

Systems and methods described herein may be embodied in other specific forms without departing from the characteristics thereof. References to "approximately," "about," "substantially" or other terms of degree include variations of +/−10% from the given measurement, unit, or range unless explicitly indicated otherwise. Coupled elements can be electrically, mechanically, or physically coupled with one another directly or with intervening elements. Scope of the systems and methods described herein is thus indicated by the appended claims, rather than the foregoing description, and changes that come within the meaning and range of equivalency of the claims are embraced therein.

The term "coupled" and variations thereof includes the joining of two members directly or indirectly to one another. Such joining may be stationary (e.g., permanent or fixed) or moveable (e.g., removable or releasable). Such joining may be achieved with the two members coupled directly with or to each other, with the two members coupled with each other using a separate intervening member and any additional intermediate members coupled with one another, or with the two members coupled with each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

References to "or" can be construed as inclusive so that any terms described using "or" can indicate any of a single, more than one, and all of the described terms. A reference to "at least one of 'A' and 'B'" can include only 'A', only 'B', as well as both 'A' and 'B'. Such references used in conjunction with "comprising" or other open terminology can include additional items.

Modifications of described elements and acts such as variations in sizes, dimensions, structures, shapes and proportions of the various elements, values of parameters, mounting arrangements, use of materials, colors, orientations can occur without materially departing from the teachings and advantages of the subject matter disclosed herein. For example, elements shown as integrally formed can be constructed of multiple parts or elements, the position of elements can be reversed or otherwise varied, and the nature or number of discrete elements or positions can be altered or varied. Other substitutions, modifications, changes and omissions can also be made in the design, operating conditions and arrangement of the disclosed elements and operations without departing from the scope of the present disclosure.

References herein to the positions of elements (e.g., "top," "bottom," "above," "below") are merely used to describe the orientation of various elements in the FIGURES. The orientation of various elements may differ according to other exemplary embodiments, and that such variations are intended to be encompassed by the present disclosure.

What is claimed is:

1. A method for compressing image data, comprising: identifying, by a processor, a plurality of sub-blocks of a block of image data including a first sub-block and a second sub-block;

identifying, by the processor, for a first data characteristic of data of the first sub-block and a second data characteristic of data of the second sub-block, a number of bits per pixel sample, an offset of a starting endpoint representing a number of zero values in pixel samples in each sub-block, and a range of values of pixel samples within each sub-block, the range of values being determined to satisfy a cost function of a compression rate and a distortion efficiency;

determining, by the processor, a first compression technique based at least on the first data characteristic of the first sub-block;

determining, by the processor, a second compression technique, based at least on the second data characteristic of the second sub-block; and compressing, by the processor, the first sub-block using the first compression technique and the second sub-block using the second compression technique.

2. The method according to claim 1, wherein each of the first data characteristic and the second data characteristic further comprises at least one of an image quality, a compression rate, or a distortion efficiency.

3. The method according to claim 1, wherein each of the first and second compression techniques is one of lossless compression, lossy compression, prediction-based compression, or no compression.

4. The method according to claim 1, wherein the block of image data corresponds to one of a plurality of channels, each channel being one of a color channel or an alpha channel.

5. The method according to claim 1, wherein the offset is a non-zero value.

6. The method according to claim 4, further comprising: generating a plurality of first compressed blocks by compressing a plurality of first blocks, each block of the plurality of first blocks corresponding to one of the plurality of channels; and dividing the plurality of first compressed blocks into a plurality of first data slices, each of the plurality of first data slices including a plurality of portions, each portion including compressed blocks corresponding to a respective one of the plurality of channels.

7. The method according to claim 6, further comprising: generating a plurality of second compressed blocks by compressing a plurality of second blocks, each block of the plurality of second blocks corresponding to one of the plurality of channels; and dividing the plurality of second compressed blocks into a plurality of second data slices, each of the plurality of second data slices including a plurality of portions, each portion including compressed blocks corresponding to a respective one of the plurality of channels, wherein the plurality of first blocks have a first multum in parvo (MIP) level different from a second MIP level of the plurality of second blocks.

8. The method according to claim 6, further comprising: generating, based on the plurality of first data slices, an indirection table indicating address information of compressed blocks in the plurality of data slices.

9. A device for compressing image data, comprising: one or more processors, coupled to memory and configured to identify a plurality of sub-blocks of a block of image data including a first sub-block and a second sub-block;

identify, for a first data characteristic of data of the first sub-block and a second data characteristic of data of the second sub-block, a number of bits per pixel sample, an offset of a starting endpoint representing a number of zero values in pixel samples in each sub-block, and a range of values of pixel samples within each sub-block, the range of values being determined to satisfy a cost function of a compression rate and a distortion efficiency;

determine a first compression technique based at least on the first data characteristic of the first sub-block;

determine a second compression technique based at least on the second data characteristic of the second sub-block; and compress the first sub-block using the first compression technique and the second sub-block using the second compression technique.

10. The device according to claim 9, wherein each of the first data characteristic and the second data characteristic further comprises at least one of an image quality, a compression rate, or a distortion efficiency.

11. The device according to claim 9, wherein each of the first and second compression techniques is one of lossless compression, lossy compression, prediction-based compression, or no compression.

12. The device according to claim 9, wherein the block of image data corresponds to one of a plurality of channels, each channel being one of a color channel or an alpha channel.

13. The device according to claim 9, wherein the offset is a non-zero value.

14. The device according to claim 12, wherein the processor is further configured to:

generate a plurality of first compressed blocks by compressing a plurality of first blocks, each block of the plurality of first blocks corresponding to one of the plurality of channels; and divide the plurality of first compressed blocks into a plurality of first data slices, each of the plurality of first data slices including a plurality of portions, each portion including compressed blocks corresponding to a respective one of the plurality of channels.

15. The device according to claim 14, wherein the processor is further configured to:

generate a plurality of second compressed blocks by compressing a plurality of second blocks, each block of the plurality of second blocks corresponding to one of the plurality of channels; and divide the plurality of second compressed blocks into a plurality of second data slices, each of the plurality of second data slices including a plurality of portions, each portion including compressed blocks corresponding to a respective one of the plurality of channels, wherein the plurality of first blocks have a first multum in parvo (MIP) level different from a second MIP level of the plurality of second blocks.

16. The device according to claim 15, wherein the processor is further configured to:

generate, based on the plurality of first data slices, an indirection table indicating address information of compressed blocks in the plurality of data slices.

17. A non-transitory computer readable medium storing program instructions for causing one or more processors to:

identify a plurality of sub-blocks of a block of image data including a first sub-block and a second sub-block;

identify, for a first data characteristic of data of the first sub-block and a second data characteristic of data of the second sub-block, a number of bits per pixel sample, an offset of a starting endpoint representing a number of zero values in pixel samples in each sub-block, and a range of values of pixel samples within each sub-block, the range of values being determined to satisfy a cost function of a compression rate and a distortion efficiency;

determine a first compression technique based at least on the first data characteristic of the first sub-block;

determine a second compression technique based at least on the second data characteristic of the second sub-block; and compress the first sub-block using the first compression technique and the second sub-block using the second compression technique.

18. The non-transitory computer readable medium according to claim 17, wherein each of the first data characteristic and the second data characteristic further comprises at least one of an image quality, a compression rate, or a distortion efficiency.

* * * * *